(12) United States Patent
Marlow et al.

(10) Patent No.: US 8,423,469 B2
(45) Date of Patent: Apr. 16, 2013

(54) SYSTEM AND METHOD FOR ENHANCING THE EFFICIENCY OF REAL ESTATE TRANSACTIONS

(76) Inventors: Michael B. Marlow, Sugar Land, TX (US); Mark Marlow, Cypress, TX (US)

( * ) Notice: Subject to any disclaimer, the term of this patent is extended or adjusted under 35 U.S.C. 154(b) by 231 days.

(21) Appl. No.: 12/592,141

(22) Filed: Nov. 19, 2009

(65) Prior Publication Data

US 2010/0174658 A1    Jul. 8, 2010

Related U.S. Application Data

(63) Continuation-in-part of application No. 11/399,749, filed on Apr. 7, 2006, now abandoned.

(51) Int. Cl.
*G06Q 40/00* (2012.01)
(52) U.S. Cl.
USPC .............. 705/45; 705/30; 705/40; 705/707
(58) Field of Classification Search .......... 705/9, 26, 705/313, 707, 30–45
See application file for complete search history.

(56) References Cited

U.S. PATENT DOCUMENTS

| | | | | |
|---|---|---|---|---|
| 2001/0037287 A1* | 11/2001 | Broadbent et al. | ............. | 705/38 |
| 2004/0049445 A1* | 3/2004 | Kishore | ................. | 705/37 |
| 2005/0149419 A1* | 7/2005 | Blumberg et al. | ............. | 705/35 |
| 2006/0271474 A1* | 11/2006 | Patterson | ................. | 705/39 |

* cited by examiner

*Primary Examiner* — Tien Nguyen
(74) *Attorney, Agent, or Firm* — The Matthews Firm

(57) ABSTRACT

A computer system and method, for real estate transactions concerning the purchase or sale of real property, comprises engaging a realtor and a mortgage originator for providing unified communication among a client, the realtor and the mortgage originator, providing a simplified loan process for the client and upon a sale and purchase of the property, distributing to the client a predetermined portion of money from the real estate commission received by the realtor and a portion of the mortgage origination proceeds to the realtor, such that upon any combination of a sale and purchase of the property, the client receives a predetermined portion of money from the purchase price of the property, the loan amount and the listing fee, the realtor receives the full amount of the predetermined real estate commission for the sale consummated, and the mortgage originator receives a proportionately smaller portion of the mortgage origination proceeds.

13 Claims, 29 Drawing Sheets

Prior Art

Type of Transaction: Used Home Purchase – Double Combination

R.E.C.A.P Services Provided: Buyer's Representation, Mortgage Loan Services

Revenue to REFUND Realty &Mortgage:     $5,367.00 (702) commission paid by seller $5,000.00 (708) special incentive paid by seller <u>$3,433.09 (812)</u> yield spread premium paid by lender.

$13,800.00 gross revenue

-    <u>$10,367</u> commission paid to Realtor (100%)
                                             $3,433.00 net revenue to broker

Commission paid to REFUND Realtor (100%):    $ 5,367.00

<u>$5,000.00</u>

$10,367.00 Total Realtor Commission (100%)

-    <u>$5,000.00</u>   Realtor Refund to Buyer
                                             $5,367.00 Net Realtor Commission

Savings and benefits for the buyer due to

The R.E.C.A.P. method:                  $5,300.00 = closing costs paid by seller on buyer's behalf.

$1,699.55 = typical origination fee (1%) waived

<u>$5,000.00</u> = Refund check given to buyer after closing $11,999.55 = total savings to buyers due to R.E.C.A.P.

Summary:

In this scenario, the R.E.C.A.P method allowed the buyer to save *$11,999.55*, the Realtor to receive *$5,367.00* after refunding $5,000 to the buyer after closing, and the broker to net *$3,433.00* without charging the typical 1% origination fee. Please note that the seller's representative, Creekview Realty, obviously discounted their commission to 3% in order to get the listing and it resulted in them having to do all of the work associated with listing a home for *$0.00* commission (701) while everyone involved in the R.E.C.A.P. transaction either made or saved thousands of dollars.

FIG. 10

Type of Transaction: New Home Purchase – Triple Combination

R.E.C.A.P Services Provided: Buyer's Representation, Mortgage Loan Services

Revenue to REFUND Realty &Mortgage:     $4,799.70 (701) commission paid by seller $4,500.00 (704) special incentive paid by seller $3,780.57 (811) yield spread paid by lender $800.13 (811) origination paid by seller $13,880.40 gross revenue

- $9299.70 commission paid to Realtor (100%)
- $1,775.00 rebate to buyer $2,805.70 net revenue to broker Commission paid to REFUND Realtor (100%):     $ 4,799.70 (701)

+ $4,500.00 (704)

$9,299.70 Total Realtor Commission (100%)

Savings to Seller Due to R.E.C.A.P.     $5,325 ( 3% x $177,500) = savings on typical cost of listing a home on MLS. We listed the builder/seller's home for free, thus saving half of the typical fee charged to list a home by most traditional real estate companies.

Savings and benefits for the buyer due to

The R.E.C.A.P. method:     $1,686.25(803,808,809,811) closing costs paid by seller $886.12 (801) over half of typical origination fee (1%) waived $1,775.00 refund check to buyer after closing $4,347.37 R.E.C.A.P savings to buyer

FIG. 11A

Summary:

In this scenario, the R.E.C.A.P. method allowed the buyer to save $4,347.37 through rebates and credits and get into a home for a total of $6,036 as opposed to $11,447.37 (*5% down payment = $8,875 + $886.12 waived origination fee + $1,686.25 seller paid closing costs = $11,447.37*). The Realtor received 100% commission $9,299.70, and the brokerage was able to capture a net revenue of $2,805.70. The builder/seller was able to save $5,325 in commissions typically paid for listing a property, which is what allowed the seller to pay some of the seller's closing costs.

The R.E.C.A.P. dual capacity business method allowed for full service and representation, while providing substantial savings to the seller and buyer. It also allowed for 100% of the real estate commission to go to the agent while still providing substantial net revenues to the broker.

In contrast to a traditional real estate or mortgage company business model, this would not be feasible if there were two real estate companies involved, buyer's rep and seller's rep, and an outside lender (see comparable H.U.D.1 Settlement Statement). In contrast to a "discount brokerage", the seller and buyer would have received reduced services and representation for lower commissions and/or rebates.

FIG. 11B

MODULE: ADMINISTRATOR – MANAGE USERS

SYSTEM AND METHOD FOR ENHANCING THE EFFICIENCY OF REAL ESTATE TRANSACTIONS

CROSS REFERENCE TO RELATED APPLICATION

The present application is a continuation-in-part application of the application of Michael B. Marlow and Mark Marlow, U.S. Ser. No. 11/399,749, filed Apr. 7, 2006 now abandoned, entitled System And Method For Real Estate Transactions.

FIELD OF THE INVENTION

The present invention relates generally to a computer system and method for enhancing the efficiency of real estate transactions. Specifically, the present invention relates to a computer system and method for the sale of property where the seller/buyer's agent (the realtor), the mortgage originator and the buyer coordinate the sale of the property such that all three, or a combination thereof, maximize the returns received with respect to the sale of the property.

BACKGROUND OF THE INVENTION

The real estate market, residential and commercial, functions in an archaic manor that has gone essentially unchanged over time. The archaic state of the real estate market is true for several reasons. First, real estate, especially residential real estate, is being bought and sold according to a decades old paradigm. The primary players in the industry are the seller/buyer's agents, i.e., realtors, the loan officers, mortgage originators and title companies. These entities are fairly conservative, somewhat technically unsophisticated, and generally reluctant to embrace change. The characteristics embodied by the primary players results in a process which, for many home sellers and buyers, is shrouded in mystery, appearing arcane and convoluted, not to mention inefficient, inconvenient and expensive.

Typically, one of the most complex and significant financial events in most people's lives is the purchase or sale of a home or investment property. Because of this complexity and significance, people typically seek the help of real estate brokers, sales agents, loan officers and mortgage originators when buying or selling real estate.

Real estate brokers and sales agents are familiar with local zoning and tax laws and, most importantly, know where to obtain financing. Real estate agents usually are independent sales workers who provide their services to a licensed real estate broker on a contract basis. In return, the broker pays the agent a portion of the commission earned from the agent's sale of the property. Brokers are independent businesspeople who sell real estate owned by others; they also may rent or manage properties for a fee. When selling real estate, brokers or agents arrange for title searches and for meetings between buyers and sellers during which the details of the transactions are agreed upon and the new owners take possession of the property. A broker or agent may help to arrange favorable financing from a mortgage originator or lender for the prospective buyer; often, this makes the difference between success and failure in closing a sale. In some cases, brokers and agents assume primary responsibility for closing sales; in others, lawyers or lenders do. Brokers supervise agents who may have many of the same job duties. Brokers also supervise their own offices, advertise properties, and handle other business matters. Some combine other types of work, such as selling insurance or practicing law, with their real estate business.

Besides making sales, agents and brokers must have properties to sell. Consequently, they spend a significant amount of time obtaining listings or agreements by owners to place properties for sale with the firm. When listing a property for sale, agents and brokers compare the listed property with similar properties that recently sold, in order to determine a competitive market price for the property. Once the property is sold, both the agent who sold it and the agent who obtained the listing receive a portion of the commission. Thus, agents who sell a property that they themselves have listed can increase their commission.

Most real estate brokers and sales agents sell residential property. A small number that are usually employed in large or specialized firms sell commercial, industrial, agricultural or other types of real estate. Every specialty requires knowledge of that particular type of property and clientele. Selling or leasing business property requires an understanding of leasing practices, business trends, and the location of the property. Agents who sell or lease industrial properties must know about the region's transportation, utilities, and labor supply. Whatever the type of property, the agent or broker must know how to meet the client's particular requirements, and meeting these needs is critical to making a sale.

Before showing residential properties to potential buyers, agents meet with them to get a feeling for the type of home the buyers would like. In this prequalifying phase, the agent determines how much the buyers can afford to spend. In addition, the agent and the buyer usually sign a loyalty contract which states that the agent will be the only one to show houses to buyers. An agent or broker then generates lists of properties for sale, their location and description, and available sources of financing. In some cases, agents and brokers use computers to give buyers a virtual tour of properties in which they are interested. With a computer, buyers can view interior and exterior images or floor plans without leaving the real estate office.

Agents may meet several times with prospective buyers to discuss and visit available properties. Agents identify and emphasize the most pertinent selling points. To a young family looking for a house, they may emphasize the convenient floor plan, the area's low crime rate and the proximity to schools and shopping centers. To a potential investor, they may point out the tax advantages of owning a rental property and the ease of finding a renter. If bargaining over price becomes necessary, agents must follow their client's instructions carefully and may have to present counteroffers in order to get the best possible price.

Once both parties have signed the contract, the real estate broker or agent must make sure that all special terms of the contract are met before the closing date. For example, the agent must make sure that the mandated and agreed-upon inspections, including that of the home and termite and radon inspections, take place. Also, if the seller agrees to any repairs, the broker or agent must see that they are made. Increasingly, brokers and agents are handling environmental problems as well, by making sure that the properties they sell meet environmental regulations. For example, they may be responsible for dealing with lead paint on the walls. While loan officers, attorneys, mortgage originators or other persons handle many details, the agent must ensure that they are carried out.

The loan officer or loan agent in conjunction with the mortgage originator or mortgage loan broker help clients locate money to borrow and assist them with many objectives including filing-out the required loan application and the additional paperwork necessary in order to process the loan.

Today, most loan officers or loan agents work with a mortgage company. Their attraction is that they provide their loan officers and loan agents with a greater array of money sources through various private and institutional lenders. This allows a loan officer or loan agent to qualify more borrowers. By being better able to meet the needs of a greater number of prospective clients this helps their agents develop a more lucrative career and provides the company with a greater income.

Loan officers and agents facilitate the lending by seeking potential clients and assisting them in applying for various types of loans. Loan officers and agents also gather information about clients and businesses to ensure that an informed decision is made regarding the quality of the loan and the probability of repayment. In many instances, loan officers or agents act as salespeople.

Commercial loan officers, as an example, one working for a bank, may contact firms to determine their needs for loans. If a firm is seeking new funds, the loan officer will try to persuade the company to obtain the loan from their institution. Similarly, mortgage loan officers or agents, those representing various lenders, develop relationships with commercial and residential real estate companies so that, when an individual or firm buys a property, the real estate agent might recommend them to handle the clients financing needs. Once this initial contact has been made, loan officers guide clients through the process of applying for a loan.

The loan process begins with a formal meeting or telephone call with a real estate agent or a prospective client, during which the mortgage loan agent obtains basic information about the purpose of the loan and explains the different types of loans and credit terms that are available to the applicant. Loan agents answer questions about the process and sometimes assist clients in filling-out the required application. After a client completes the application, the loan agent begins the process of analyzing and verifying the application to determine the client's credit worthiness. Often, loan agents can quickly access the client's credit history by computer and obtain a credit score. This score represents the credit worthiness of a person or business as assigned by a software program that makes the evaluation. In cases where a credit history is not available or where unusual financial circumstances are present, the loan agent may request additional financial information from the client or, in the case of commercial loans, copies of the company's financial statements. With this information, loan officers who specialize in evaluating a client's credit worthiness, who are usually working for the lender of the funds, would be asked to conduct a financial analysis or other risk assessment of the potential client. This additional information would be included as written comments in the client's loan file, which is used to analyze whether the prospective loan meets the lending institution's requirements.

The lender or the source of the money, once receiving the loan package would in consultation with their managers, decide whether or not to grant or approve the loan. If the loan is approved, a repayment schedule is arranged with the client. A loan may be approved that would otherwise be denied if, for example, the customer can provide the lender with appropriate collateral-property pledged as security for the repayment of a loan.

A loan officer or agent earns a commission on a completed loan that can be as little $500 to as much as $10,000 or more depending on the loan amount and points or loan fee charged.

In comparison, the job descriptions of the real estate agent and the loan officer have overlapping functions, from what each must do in performing his or her job to how they get paid for what they have done.

Thus, there is a high level of complexity associated with any real estate transaction. And, essentially any real estate transaction is a challenging endeavor. In order to facilitate a residential real estate transaction from beginning to end, the conservative players in the industry must work together. However, in most situations, the primary players in the real estate market are forced to act against their own perceived interests in consummating any real estate transaction. The interaction between the primary players, real estate agents or realtors, loan officers, mortgage originators and title companies, make the home selling and buying process practically unintelligible to the typical home sellers and buyers.

For example, when someone wants to buy a home under the current paradigm, not only must they spend inordinate amounts of time attending open houses and meeting with their real estate agent, they must also meet and communicate with the loan officer, lending institutions, title companies, and escrow officers. As the number of players in the purchase and sale of property increases, the inconveniences and frustration of the potential buyer is exacerbated. In short, despite the rapid advancement of technology in many areas of commerce, buying or selling a home today can be a very frustrating, inefficient, and time-consuming process.

All of the major real estate firms use business models designed to recruit as many salespeople as possible through aggressive commission splits. Because of the commission splits and other factors, none of the existing models are based on the premise of saving the consumer money or making the transaction safer for the consumer, the lender, and the sales person. There is a long felt and unmet need for a real estate system that can guaranty savings for the consumer and the real estate firm through greater efficiencies. All of the major real estate firms have attempted unsuccessfully in making the transaction safer by guarantying savings for the consumer and the real estate firm through greater efficiencies.

Specific accountability with respect to all parties involved is required, but to date is not available. One aspect of specific accountability is to reduce the number of people you have in a transaction. With fewer people involved, the odds of complications during the transaction is lessened and it is easier to determine if a problem exists, and what to do about it. Specific accountability is not accomplished by technological advances such as computers, cell phones, PDAs, and the internet. Specific accountability goes to the very heart of the business transaction, and requires a dramatic change in the way business is done.

To appreciate the magnitude of the undertaking required for implementing a program of specific accountability, it is important to understand the traditional real estate business model. Numerous technological advances such as computers, cell phones, PDAs, and the internet have made significant changes in the way realtors list and advertise real estate. Within the last few decades, the real estate industry has evolved from a system in which realtors marketed their listings from brick-and-mortar storefronts with yard signs and print advertising in local periodicals to virtual offices where realtors can effectively work from their home, car, and even directly from their clients' homes. Innovations such as the internet have made it possible for realtors to market their listings worldwide by utilizing countless websites and search engines. Online databases such as MLS, appraisal districts and industry related websites have given realtors, and the general public, access to valuable information from which to make more informed decisions throughout the selling and buying process. But all these advancements have created less specific accountability, not more.

The mortgage origination industry has also experienced vast improvements in the resources available for taking and processing applications, processing loans, and providing funding for the closings. In the very recent past, homebuyers searching for acceptable financing would be referred to a loan officer at a brick-and-mortar storefront, apply for a mortgage by filling out a hand written application, and wait for an approval. In today's virtual environment, homebuyers can go online and shop from multiple mortgage brokerages and mortgage banks, complete their application, and fax or email their required documentation needed for processing, approval, and ultimately closing. Today's homebuyers have access to limitless information and almost instantaneous pre-approvals.

Although there is no denying the advantages that technological innovations have provided to the real estate and mortgage industries, very little innovation has occurred in the way the home sellers, home buyers, and loan applicants are represented. Although local, state, and federal agencies are continuing to require improvement in the way the consumers are represented in a real estate transaction, the real estate and mortgage industries have done little or nothing to change the status quo. On an ongoing basis, governing bodies are requiring realtors and loan officers to obtain higher levels of industry knowledge, new and increased licensing, and substantially more upfront disclosure.

In just a few short decades, governing bodies have changed the face of many local real estate markets. The local real estate markets have been changed from transactions in which (1) all licensed agents represented only the sellers, (2) the loan officers were not required to be licensed with respect to transactions in which buyers and sellers can be equally represented to, at least, the loan officers being held to a higher degree of accountability through licensing and/or registries. Increased licensing and educational requirements have made some improvements in accountability to the consumer; however, it has not yet resulted in the specific accountability needed to replace the outdated Referral/ABA (Accredited Business Affiliation) system that is currently in place today.

The current Referral/ABA business method operates just like it has for several decades, and even centuries. In the present system, a real estate agent becomes an associate of a real estate brokerage. Although the realtor may be an employee of the brokerage, many times the agent is self-employed and is treated as contract labor. The agent will typically have a written agreement that specifies the terms of the agent/broker association. In many of these written agreements the compensation is spelled out as to what percentage of commission income the agent will receive and what percentage the brokerage will receive. In the traditional Referral/ABA business method, the agent or brokerage will often provide the consumer a particular loan officer's phone number or a list of loan officers to contact for mortgage financing. In many cases, loan officers will work for a mortgage brokerage or a mortgage bank. Like real estate agents, the loan officer may be self-employed and treated like contract labor or be an employee of the mortgage company. Although there are limitless compensation models, in many association agreements, the loan officer is also paid a percentage of the origination proceeds with the remainder going to the company. Despite the many disadvantages to this model, the Referral/ABA business method has been the predominant system for decades, if not, centuries. FIG. 1 is a flow chart of a visual example of a Referral/ABA business method transaction. Through inefficient duplicity, the Traditional ABA/Referral business method adds unnecessary additional costs and confusion to the consumer throughout the home buying, selling, and financing process.

Some of the primary functions performed by a listing agent, buyer's agent, or loan officer during the sale, purchase, or financing of real estate are listed below.

Identify the client's wants and needs. Determine why the client is selling, buying, or in need of financing.

Evaluate the client's credit. Order credit reports and review credit scores, payment history, collection status, and account balances.

Complete loan application. Help client complete the loan application. Applications can be completed online, over the phone, through the mail, or in person.

Obtain documents needed to verify client's income and assets. These include items such as: w-2s, tax returns, bank and investment account statements and other assets.

Determine the type of loan client needs. Establish the down payment (loan-to-value), type (conventional, FHA, VA, subprime), term, and approximate interest rate.

Establish if the client's desired loan conforms to the guidelines. Determine if the client will qualify for the type of loan wanted or needed.

Present alternative loan programs. Allow the client to compare different loan options that offer different down payments, terms, and rates.

Submit completed loan application to processing. Loan file is giving to the processing department for review and submission to underwriting.

Analyze underwriting conditions. Review conditions that will need to be met prior to final loan approval.

Discuss underwriting conditions with client. Present the underwriters findings to the client and prepare responses and solutions to satisfy the conditions.

Coordinate satisfying underwriting conditions with the processing department. Implement a course of action with the processor that satisfies the loan conditions.

Obtain documents needed to satisfy underwriting conditions. Gather items such as verification of employment and verification of rent.

Resolve inaccurate information on client's credit report. Work with the client to help get incorrect or wrong information removed from the credit report.

Review pre-approval with client. Go over the underwriting findings and limitations of the loan with the client.

Review pre-approval with client's agent. Discuss the limitations of the loan with the client's realtor.

The loan officer typically does not determine why the client is selling, buying, or in need of financing; ordering credit reports and reviewing credit scores, payment history, collection status, and account balances; or working with the client to help get incorrect or wrong information removed from the credit report. The listing agent identifies the client's wants and needs and determines why the client is selling, buying, or in need of financing. The buyers agent evaluates the client's credit; orders credit reports and reviews credit scores, payment history, collection status, and account balances; resolves inaccurate information on the client's credit report and works with the client to help get incorrect or wrong information removed from the credit report; as well as identifies the client's wants and needs and determines why the client is selling, buying, or in need of financing. The loan officer performs the tasks that the listing agent and the buyer's agent do not do.

In the real estate realm, essentially all of the firms recruit as many salespeople as possible through aggressive commission splits. Real estate business is not based on the premise of saving the consumer money or making the transaction safer for the consumer, the lender, and the sales person.

There have been attempts to modernize the process. Information technology is sometimes used in the process in a peripheral sense, but is not central to the typical residential real estate transaction. For example, some real estate agents have an online presence, using web sites for providing information to prospective buyers and sellers. Online automation of the loan brokering process is also currently available. However, none of the automated real estate efforts do more than facilitate one or more of the many steps in buying or selling a home. That is, no known real estate effort can rectify the built-in, inherent competitive nature of the primary players in the industry, i.e., the realtors, the mortgage brokers and the title companies. And, the built-in, inherent competitive nature of the primary players in the real estate industry results in a situation that is vague, ambiguous and costly to the buyer or seller. The process is time consuming and inefficient. And in many situations, the real estate system is a system that is adverse to the very entity that it was designed to help, the buyer.

It is, therefore, a feature of the present invention to provide a computer system and method for real estate transactions that results in the buyer receiving clear, unified communication from the primary market entities, a simplified loan process and substantial savings.

A feature of the present invention is to provide a computer system and method that would guaranty savings for the consumer and those assisting the consumer.

Another feature of the present invention is to provide a computer system and method having efficiencies created by dual licenses while making the transaction safer by funneling the responsibility and possible recourse down to one person, one company, or one team.

Yet another feature of the present invention is to provide a computer system and method with fewer people in a transaction, thus fewer people to pay which lessens the odds of complications during the transaction and makes it easy to pinpoint who created problems, or worse, who perpetrated unethical or fraudulent action that harmed the consumer or the lender.

A feature of the present invention is to provide a computer system and method for real estate transactions that results in the selling agent receiving 100% of any predetermined commission.

Another feature of the present invention is to provide a computer system and method for real estate transactions that results in the selling agent not having any desk fees, monthly fees or transaction fees.

Another feature of the present invention is to provide a computer system and method for real estate transactions that results in competitive commission splits for all transactions regardless of who originates the loan.

Another feature of the present invention is to provide a computer system and method for real estate transactions that results in the buyer receiving reliable communications regarding the mortgage loan application and closing process.

Yet another feature of the invention is to provide a computer system and method for real estate transactions that creates a full service agent.

Still another feature of the present invention is utilizing a computer system and method for real estate transactions such that a full service agent can compete in a growing discount realty market without cutting fees.

Another feature of the present invention is to provide a computer system and method for real estate transactions such that a full service agent can compete without being priced out of a transaction when competing with traditional full service companies.

Yet another feature of the present invention is to provide a computer system and method for real estate transactions such that an agent can supplement income with non-sales related loans.

Still another feature of the present invention is to provide a computer system and method for real estate transactions such that an agent takes the mortgage application, and where appropriate, educates the buyer/borrower in the home buying and financing process, orders inspections, maintains regular contact with the buyer and the lender, determines whether the property is in a flood zone, participates in the closing, collects financial information concerning the transaction, and initiates ordering appraisals.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, methods and systems for real estate transactions are provided. The methods and computer systems for real estate transactions concern the purchase or sale of real property in association with a selling agent that receives a commission for any sale consummated and a mortgage originator that receives a portion of the mortgage origination proceeds.

A method of the present invention comprises the steps of engaging the realtor to assist in the real estate transaction, engaging the mortgage originator to assist in the real estate transaction, and providing unified communication among the buyer, the realtor and the mortgage originator. Thus, a simplified loan process is provided for the buyer by the coordination between the realtor and the mortgage originator due to the unified communication between or among the buyer, the realtor and the mortgage originator. The buyer receives, from the real estate commission received by the realtor, a predetermined portion of money from either the purchase price of the property or the loan amount. The realtor receives a portion of the mortgage origination proceeds typically received by the mortgage originator to compensate for the portion of the purchase price of the property and loan amount distributed to the buyer from the real estate commission received by the realtor. Therefore, in using this method of the present invention, the buyer receives a predetermined portion of money from the purchase price of the property and/or the loan amount, the realtor receives the full amount of the predetermined real estate commission for the sale he or she made and the mortgage originator receives a proportionately smaller portion of the mortgage origination proceeds.

Another method of the present invention comprises the steps of engaging the realtor to participate in the real estate transaction, engaging the mortgage originator to participate in the real estate transaction, providing unified communication among the client, the realtor and the mortgage originator, whereby the mortgage originator may be the realtor. Thus, a simplified loan process is created for the client by the coordination between the realtor and the mortgage originator due to the unified communication between or among the client, the realtor and the mortgage originator. Upon the sale of property, the client receives, from the real estate commission received by the realtor, a predetermined portion of money from the purchase price, the loan amount and/or the listing fee. Then, the realtor receives a portion of the mortgage origination proceeds typically received by the mortgage originator to compensate for the portion of the purchase price, loan amount and/or listing fee distributed to the client from the real estate commission received by the realtor. Similarly, upon the purchase of property, the client receives, from the real estate commission received by the realtor, a predetermined portion of money from the purchase price, the loan amount and/or the listing fee. Then, the realtor receives a portion of the mortgage origination proceeds typically received by the mortgage originator to compensate for the portion of the purchase price, loan amount and/or listing fee distributed to the client from the real estate commission received by the realtor. Therefore, upon a sale, a purchase, and any combination of sales and purchases, the client receives a predetermined portion of money from the purchase price of the property, the loan amount and/or the listing fee, the realtor receives the full amount of the predetermined real estate commission for the sale consummated and the mortgage originator receives a proportionately smaller portion of the mortgage origination proceeds.

In yet another method of the present invention the mortgage originator assists in the real estate transaction such that the mortgage originator acts in the capacity of a loan officer and a realtor as well as the mortgage originator thereby eliminating the conventional use of the loan officer and the realtor. The mortgage originator, to the exclusion of the typical loan officer and realtor, provides a unified communication between the client and the mortgage originator. Thus, the mortgage originator is guided to secure better mortgage terms for the client. Further, the method provides a simplified loan process for the client because of the unified communication between the client and the mortgage originator. Upon the sale of property, the client receives, from the real estate commission typically received by the realtor, a predetermined portion of money from the purchase price, the loan amount and the listing fee. And, upon the purchase of property, the client receives, from the real estate commission typically received by the realtor, a predetermined portion of money from the purchase price, the loan amount and/or the listing fee. Therefore, upon the sale of property, the purchase of property, and any combination of sales and purchases, the client receives a predetermined portion of money from the purchase price of the property, the loan amount and/or the listing fee, and the mortgage originator receives a proportionately smaller portion of the mortgage origination proceeds.

The computer system of the present invention comprises the realtor being engaged to assist in the real estate transaction and the mortgage originator being engaged to assist in the real estate transaction to the exclusion of the typical loan officer. The mortgage originator is in unified communication with the client and the realtor such that the mortgage originator is guided to secure better mortgage terms for the client. The unified communication between the client, the realtor and the mortgage originator, without the loan officer, enhances the opportunity to achieve the best possible mortgage terms for the client. A simplified loan process is created for the buyer because of the unified communication between the client, the realtor and the mortgage originator, without the loan officer. Such that, upon the sale of property, the client receives, from the real estate commission received by the realtor, a predetermined portion of money from the purchase price, the loan amount and/or the listing fee; then, the realtor receives a portion of the mortgage origination proceeds typically received by the mortgage originator to compensate for the portion of the purchase price, loan amount and/or listing fee distributed to the client from the real estate commission received by the realtor. And, upon the purchase of property, the client receives, from the real estate commission received by the realtor, a predetermined portion of money from the purchase price, the loan amount and/or the listing fee; then, the realtor receives a portion of the mortgage origination proceeds typically received by the mortgage originator to compensate for the portion of the purchase price, loan amount and/or listing fee distributed to the client from the real estate commission received by the realtor. Therefore, upon a sale, a purchase, and any combination of sales and purchases, the client receives a predetermined portion of money from the purchase price of the property, the loan amount and/or the listing fee, the realtor receives the full amount of the predetermined real estate commission for the sale consummated and the mortgage originator receives a proportionately smaller portion of the mortgage origination proceeds.

In another system of the present invention, the mortgage originator is engaged to assist in the real estate transaction such that the mortgage originator acts in the capacity of a loan officer and the realtor as well as the mortgage originator, thereby, eliminating the conventional use of the loan officer and the realtor. The mortgage originator is in unified communication with the client such that the mortgage originator is guided to secure better mortgage terms for the client. The unified communication between the client and the mortgage originator, without the loan officer and the realtor, enhances the opportunity to achieve the best possible mortgage terms for the client. Thus, a simplified loan process is created for the buyer because of the unified communication between the client and the mortgage originator. Upon the sale of property, the client receives, from the real estate commission typically received by the realtor, a predetermined portion of money from the purchase price, the loan amount and/or the listing fee. And, upon the purchase of property, the client receives, from the real estate commission typically received by the realtor, a predetermined portion of money from the purchase price, the loan amount and/or the listing fee. Therefore, upon the sale of property, the purchase of property, and/or any combination of sales and purchases, the client receives a predetermined portion of money from the purchase price of the property, the loan amount and the listing fee and the mortgage originator receives a proportionately smaller portion of the mortgage origination proceeds.

BRIEF DESCRIPTION OF THE DRAWINGS

The accompanying drawings that are incorporated in and constitute a part of the specification, illustrate a preferred embodiment of the invention and together with the general description of the invention given above and the detailed description of the preferred embodiment given below, serve to explain the principles of the invention.

FIG. 10 is a chart of an example of a used home purchase in the form of a double combination using the system and method of the present invention.

FIG. 11A/B is a chart of an example of a new home purchase in the form of a triple combination using the system and method of the present invention.

FIG. 18 is a screen capture of the user screen for managing the input data concerning the buyer's representative and the seller's representative in a preferred embodiment of the computer system for real estate transactions concerning the purchase or sale of real property encompassed by the present invention.

FIG. 21 is a screen capture of the user screen for managing the calculations associated with the buyer's representative and the seller's representative in a preferred embodiment of the computer system for real estate transactions concerning the purchase or sale of real property encompassed by the present invention.

FIG. 25 is a screen capture of the user screen for managing the calculations associated with the buyer's representative, seller's representative, and mortgage representative in a preferred embodiment of the computer system for real estate transactions concerning the purchase or sale of real property encompassed by the present invention.

FIG. 27 is a screen capture of the user screen for comparing the calculations associated with a sales person's net commission and the company profit in a preferred embodiment of the computer system for real estate transactions concerning the purchase or sale of real property encompassed by the present invention.

Figure 1:
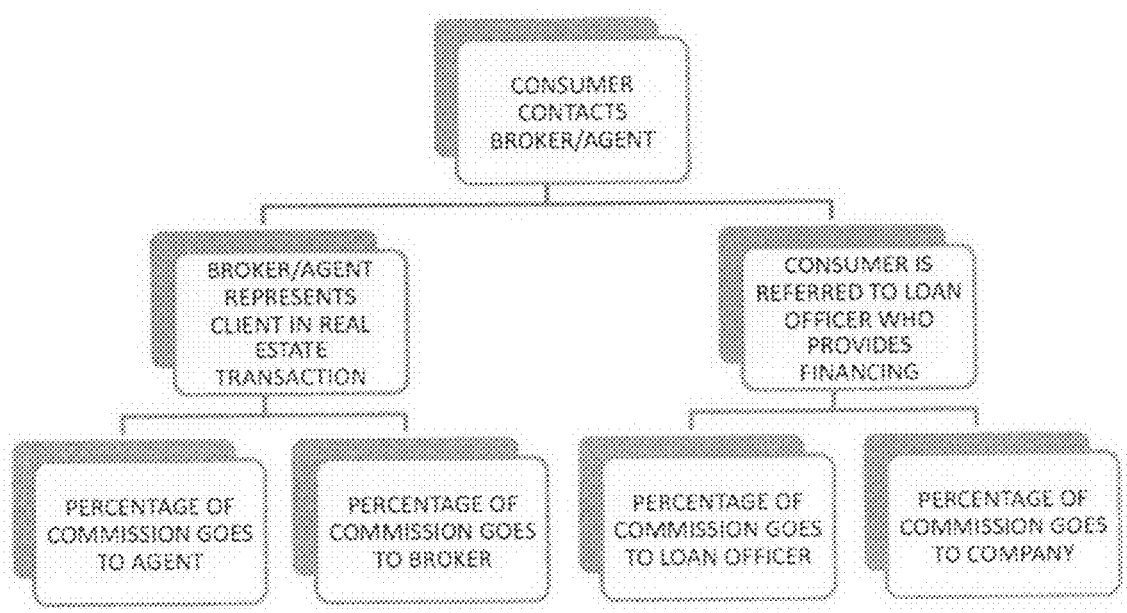
FIG. 1 is a flow chart of a visual example of a prior art Referral/ABA business method transaction.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Through inefficient duplicity, the Traditional ABA/Referral business method adds unnecessary additional costs and confusion to the consumer throughout the home buying, selling, and financing process. In contrast, the present invention, identified herein as RECAP (Real Estate Competitive Advantage Program), innovative business method reduces cost to the consumer through a synergistic dual capacity system that allows properly licensed and/or authorized professionals to act as the real estate agent and loan officer within the same transaction in a manner that eliminates many of the unnecessary redundancies often found in the traditional ABA/Referral business method. In addition to providing the consumers' unbeatable savings, the RECAP dual capacity business method simultaneously provides a competitive compensation-oriented computer system and method. By eliminating the unnecessary duplication of similar functions, RECAP's mathematically unbeatable dual-capacity computer system and method offers the consumer a higher degree of professional representation from industry professionals with superior knowledge while simultaneously providing substantially lower cost. Although the RECAP dual capacity computer system and method lowers the overall cost to the consumer, it raises the real estate agent/loan officer's commission and increases the yield to the brokerage/company.

RECAP's innovative dual capacity computer system and method allows the properly licensed and/or authorized professional to act as the real estate agent and loan officer in a manner that provides the consumer a financial incentive such as a refund or reduced closing costs while maintaining and/or increasing the agent's current commission level and yielding the brokerage/company enough revenue to maintain a full service real estate and mortgage operation. In summary, RECAP's dual capacity computer system and method allows the agent/loan officer to provide their customers reduced cost equal to or greater than many limited service discount brokerages while still maintaining or increasing the agent/loan officer's current commission levels and preserving or increasing the yield to the brokerage/company. Although it would not be possible to illustrate the limitless number of variables in which the RECAP dual capacity computer system and method is applicable, it is evident that this innovative model is mathematically unbeatable to the consumer, the agent/loan officer, and to the brokerage/company.

Along with the synergies created by the RECAP dual capacity computer system and method, without a doubt, one of the most valuable and important features of the RECAP method is the control it creates for all parties involved in a real estate transaction. The RECAP dual capacity computer system and method is the only system that creates control for the buyer's representative, seller's representative, real estate brokerage, mortgage originator, mortgage brokerage, and most importantly, the consumer because all of these functions are performed by the same person or team at the same company when the RECAP computer system and method is utilized.

When one professional or one team of professionals within the same company controls every aspect of a real estate transaction, it automatically creates certain synergies and efficiencies resulting in substantial time and cost savings. This can be demonstrated by comparing a traditional real estate transaction with a transaction that uses the RECAP dual capacity computer system and method.

FIG. 1 is a flow chart of a visual example of a prior art Referral/ABA business method transaction.

Figure 2:
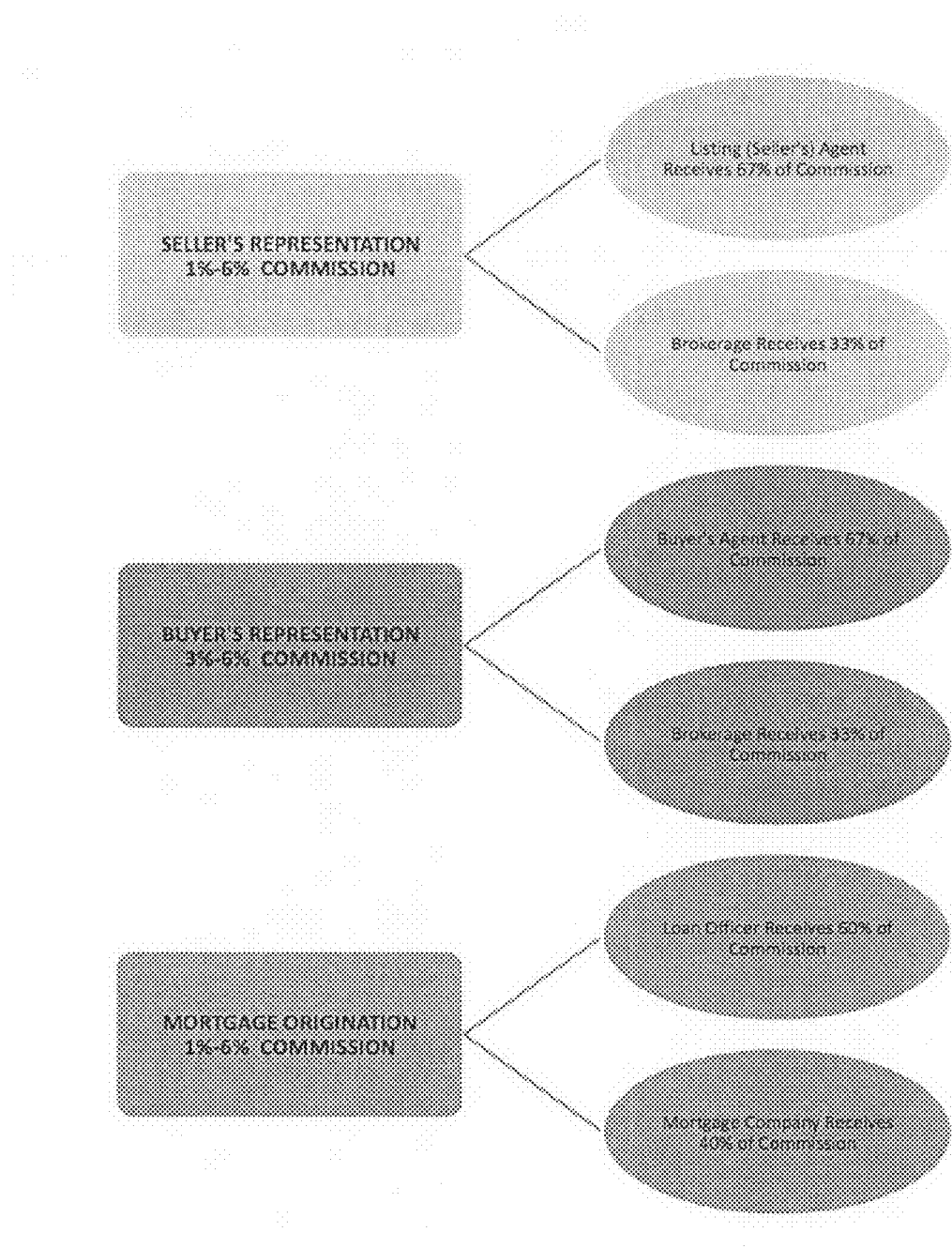
FIG. 2 is a flow chart illustrating a prior art Traditional Real Estate Transaction.

FIG. 2 is a flow chart illustrating a prior art sample of a traditional real estate transaction. The example is:

A home owner 1 contacts a real estate broker A to sell the home owner's current house for $200,000. The real estate broker A executes a listing contract with homeowner 1, and, charges 6% or $12,000 to sell the house for the homeowner 1. A second real estate broker, real estate broker B, brings a prospective buyer 2 and writes a purchase contract for the asking price of the house thereby placing him in line to receive half (3%) of the 6% listing commission which is equal to $6,000. The second real estate broker B refers a new buyer 2 to a preferred, or in-house, mortgage company. A preferred or in-house mortgage company is, typically, required to exist only as a specific entity known as an Affiliated Business Arrangement or ABA. The first mortgage company 1 provides a pre-approval to the new buyer. Thus, the original homeowner 1 contacts the first real estate broker A to begin searching for a new house since their current house is now "under contract." The first real estate broker A finds the perfect home for the original homeowner 1 and writes a purchase contract for $250,000 thereby placing him in line to receive half of the 3% listing commission or $7,500. The first real estate broker A refers home owner 1 to a different mortgage company 2 for pre-approval, and mortgage company 2 issues a pre-approval.

It is timely to evaluate the situation with respect to the real estate brokers. At this point, there are at least three realtors involved, the first real estate broker A, the second real estate broker B, and the real estate broker who has the listing on the house home owner 1 is trying to purchase. The commissions involved are (1) $6,000 to real estate broker A for listing the first homeowner 1's house, (2) $6,000 to real estate broker B for selling the house to home buyer 2, (3) $7,500 to the first real estate broker A for representing the first homeowner 1 with respect to his new home, and (4) $7,500 to the real estate broker who has the listing on homeowner 1's new home. That is a total of $27,000 just in real estate commissions that will be divided between the three real estate brokers and their brokerages.

With respect to the mortgage companies, there are two mortgage companies involved, the first mortgage company 1 and the second mortgage company 2. Each mortgage company 1, 2 will derive commissions and fees from origination fees, yield spread or service release premiums, discount points, and additional processing and underwriting fees. On a typical or customary mortgage transaction, a 1% origination fee equal to 1% of the loan amount will be charged and a 1%-3% yield spread or service release premium will be paid outside of closing to the originator from the actual lender. Assuming that each mortgage described above was for a loan amount of $180,000, the yield spread was 1% and the origination fee was 1%, each mortgage company would receive $3,600 in revenues plus any additional processing, administration, or underwriting fees. So, now the total revenues add up to $34,200 ($27,000 for the real estate brokers and $7,200 for the mortgage companies). The number of entities involved in the transaction compounds the complications. There are no less than three real estate brokers, three real estate brokerages, two loan originators, and two mortgage companies involved who are all in line to receive participating shares of the commissions that are generated; or the $34,200.

In the real world, all is not perfect. Thus, disaster is in every document. Four weeks later, the day the first home buyer 1 is supposed to close, the second real estate broker B calls the first real estate broker A to inform them that the pre-approval issued to the second home buyer 2 is no longer valid due to discoveries made during the loan process. This causes the first home buyer 1 to back out on the home he wanted to buy because he needed the funds from the sale of his current house to close on the new house. The listing agent for the house first home buyer 1 was going to purchase has to inform their seller that they must cancel their new purchase as well and the dominos continue to fall while all of the real estate brokers, mortgage originators, home buyers, and home sellers scratch their heads in disgust wondering what went wrong. Traditional real estate methods are unstable. Traditional real estate methods lack sufficient control to assure the desired outcomes.

Had the transactions been facilitated more efficiently with more oversight through control, any problems or obstacles would have been recognized immediately and resolved accordingly. Even if the issues were without solution, the simple fact that they were recognized sooner would have saved all parties time, frustration, and any monies involved such as deposits, earnest money, appraisals, inspections, etc. Focusing on other issues that can be controlled, for example, use of an alternate mortgage company, may ultimately resolve issues that are unstable in traditional methods.

Unfortunately, the above scenario occurs time and time again, weekly and daily, due to the use of one of the most inefficient business models still in use. It is the way real estate and mortgages have been done for hundreds of years and no one has ever come up with a viable solution, until the present invention. Every salesperson, real estate broker and mortgage originator is so focused on their commissions that no one ever tries to fix the instability, inefficiencies and outright injustices that are perpetuated on the consumers on each transaction. Unfortunately, that is how the incentives currently work in the traditional real estate transaction.

Why would the loan originator get involved in the listing contract, or the buyer's real estate broker in the mortgage loan? There is no incentive to do so. The typical salesperson can make a substantial amount simply focusing on his or her single responsibility and no one has any extra incentive to look out for the transaction, or in the practical sense, the consumer. Isolating each aspect of a transaction and delegating out to numerous different salespeople certainly makes things easier for the salespeople, but offers absolutely nothing in the form of value and security for the consumer.

The salesperson involved with the RECAP dual capacity computer system and method does have incentives. The more pieces of a transaction the consumer places under the RECAP method or umbrella, the more discounts or rebates are available to the consumer while commission incomes are increased for the benefit of the salesmen. The RECAP method provides the flexibility through control in case of an unforeseen obstacle to closing as well as undeniable value and security. The control, value and security is verified and documented on every H.U.D. 1 Settlement Statement generated at a real estate closing. Specific examples are provided herein.

In the first scenario everyone has performed the services requested from their clients, however, they are all different sales people working with different companies, which is typical and common for real estate and mortgage transactions. Each salesperson and company only have control of a single aspect of each transaction and are acting in blind faith with respect to the other salespeople and companies to perform their tasks in order for all of the transactions to close on time as agreed. If any one of these transactions fails to close instability is transferred to all related transactions, and all transactions are essentially off. The RECAP computer system and method is self stabilizing. Although instability can effect the RECAP computer system and method as well, the very fact that the RECAP computer system and method is capable of detailed control of every aspect of the transaction provides a restabilization of the system. The RECAP computer system and method is restabilized because the salesperson acts in a dual or multiple capacity allowing complete oversight on all aspects of each transaction and allows for quicker response times and solutions for any potential problems or obstacles arising that would inhibit the closing.

Due to the synergies and reduction in costs associated with each transaction, the RECAP computer system and method makes funds available for problems related to unexpected costs or unexpected fund shortages on the buyer's or seller's part that would prevent a closing from occurring. Typically, this is not an option for salespeople involved in a traditional transaction, as they do not have the same pool of funds to draw from as the salesperson does using the RECAP computer system and method. If the RECAP salesperson had to incorporate or inject more of their commission income into a transaction in order to make all the transactions close, the net revenue to the RECAP salesperson would still be significant and acceptable. This would not be the case with the traditional salesperson in lieu of the fact that whatever commissions are left must be split again and any potential discounts or rebates will be deducted from the real estate broker's and/or brokerage's gross revenues with no way to supplement or reimburse them.

Figure 3:
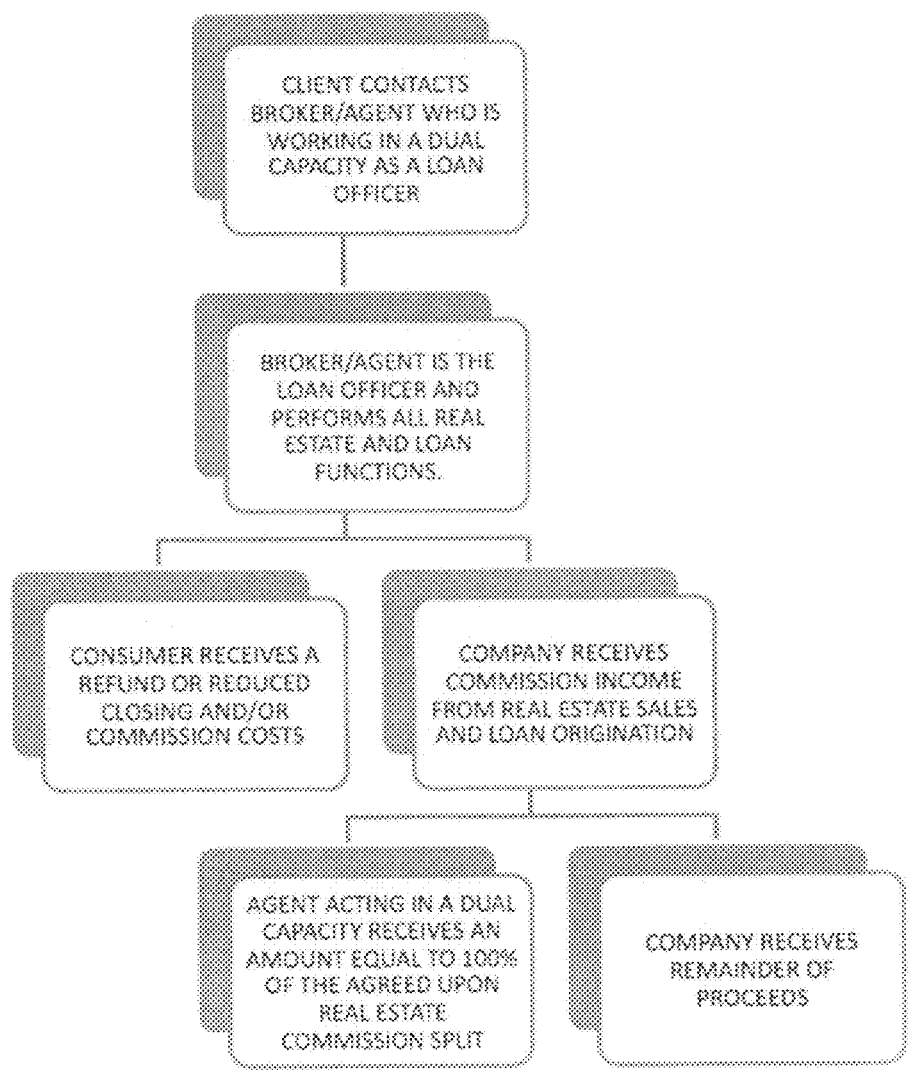
FIG. 3 is a flow chart of a visual example of the RECAP Dual Capacity Business Method.

FIG. 3 is a flow chart of a visual example of RECAP's dual capacity computer system and method. RECAP's dual capacity computer system and method allows the properly licensed and/or authorized professional to act as the real estate agent and loan officer in a manner that provides the consumer a financial incentive such as a refund or reduced closing costs while maintaining and/or increasing the agent's current commission level and yielding the brokerage/company enough revenue to maintain a full service real estate and mortgage operation. In summary, RECAP's dual capacity computer system and method allows the agent/loan officer's to provide their customers reduced cost equal to or greater than many limited service discount brokerages while still maintaining or increasing the agent/loan officer's current commission levels and preserving or increasing the yield to the brokerage/company. Although it would not be possible to illustrate the limitless number of variables in which the RECAP dual capacity computer system and method is applicable, it is evident that this system is mathematically unbeatable with respect to the consumer, the agent/loan officer and to the brokerage/company.

Further, secondary considerations illustrate the uniqueness and nonobviousness of the RECAP dual capacity computer system and method. There has existed a long-felt but unsolved need for a way to adapt to unstable and detrimental factors with respect to implementing the real estate transaction. The prior art disclose methods that teach away from the present invention that provides the ability to independently restabilize a real estate transaction. The prior art illustrate the long-felt but unsolved need for the present invention.

Another secondary consideration is the differences between the prior art and the invention defined by the asserted claims. The cited prior art discloses the application of a computer system and coupon system adapted to the traditional real estate transaction. The present invention is not so limited, and if it was, it would not be able to function to provide the synergy to adapt to varying problems, adapting to correct those problems and successfully completing the transaction.

Yet another secondary consideration is the availability of the art utilized in the invention to all in the field without realizing the significance. For example, the use of the present dual capacity computer system and method allows the properly licensed and/or authorized professional to act as the real estate agent and loan officer in a manner that provides the consumer a financial incentive such as a refund or reduced closing costs while maintaining and/or increasing the agent's current commission level and yielding the brokerage/company enough revenue to maintain a full service real estate and mortgage operation. The ability to provides the consumer a financial incentive and maintain the revenue of the brokerage is novel and nonobvious. This is ratified by the prior art teaching away from the present invention, but most importantly the prior art is silent about using dual capacity agents.

Yet still another secondary consideration is the failure of established competitors in a highly competitive market to make the invention despite the incentive to do so. Simply stated, the present invention is a significant advancement in the art because it accurately controls the real estate transaction. The control is a very important factor concerning the stability and efficacy of the transaction. The present invention solves a problem that a competitive market, until now, has failed to solve.

And still another secondary consideration is the admittedly nonobvious performance benefits realized through the dual capacity computer system and method. The present invention provides multiple performance benefits that here-to-for were not attainable in known real estate transactions. The present invention provides for real-time analysis and actual control of the real estate transaction. These performance benefits have not been achieved before the present invention.

And yet still another secondary consideration is the computer system and method achieves new and unexpected results nowhere suggested in the prior art. The prior art is completely silent concerning real-time analysis and actual control of the real estate transaction.

Yet another secondary consideration is the evaluation of the dual capacity computer system and method mandating consideration of the methodology as well as the properties and the problem solved. The methodology of the computer system and method is unique since the prior art teach away from using such a methodology. The methodology of the computer system and method are novel and nonobvious since the prior art is silent about stabilizing the transaction, real-time analysis and the actual control of the real estate transaction. All of these problems are solved by the dual capacity computer system and method, wherein the known prior art does not teach, suggest or disclose a solution to such problems.

Figure 4:
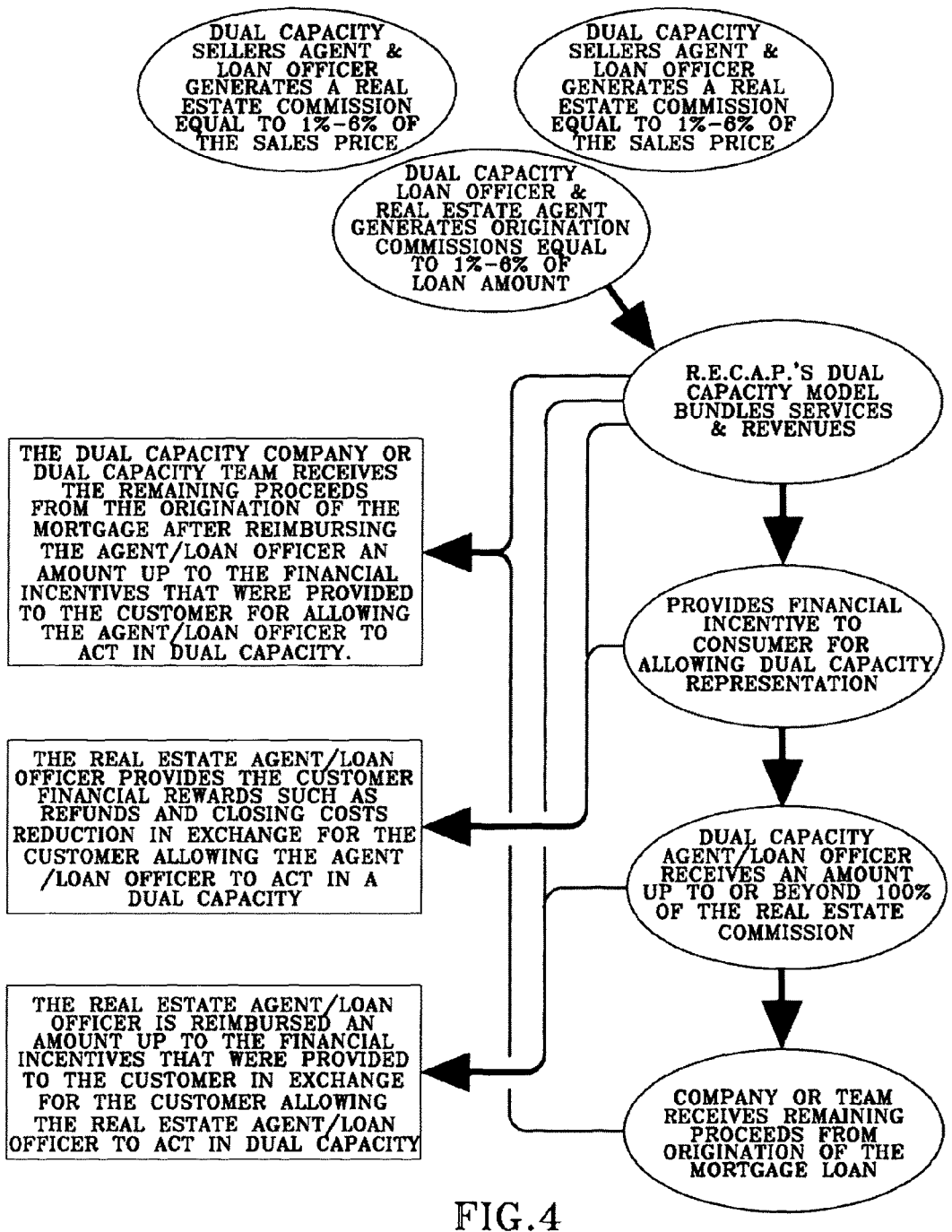
FIG. 4 is a flow chart illustrating a Sample RECAP Dual Capacity Business Method.

FIG. 4 is a flow chart illustrating one embodiment of the RECAP dual capacity computer system and method. A scenario to illustrate to illustrate the computer system and method of FIG. 4 follows. A first homeowner contacts a RECAP agent to sell her current home for $200,000. The RECAP agent takes the listing contract and charges a reduced commission of 4% or $8,000, of which 3% or $6,000 will be paid to a cooperating agent, if necessary. The discount is possible due to a bundle of services the buyer's broker, seller's broker, and mortgagor are able to offer using the RECAP method. The homeowner receives a contract on the home for $200,000 from a cooperating agent who will receive the 3% or $6,000. After evaluating the prospective buyer's pre-approval commitment issued by their mortgage company (could be the RECAP agent's company which would allow more discounts to the seller and prospective buyer while further streamlining the process), the homeowner accepts a contract offer. The home owner then requests the same RECAP agent to find a new home which entitles the agent to a 3% commission or $7,500 (assuming a $250,000 sales price), and to provide the financing allowing for an additional 2% or $4,000 (assuming a $200,000 loan amount) in revenue to the RECAP transaction. The RECAP agent acting in a dual role or dual capacity gets the loan application in process and begins the search for a new home for the client. Once a new home is agreed upon a contract is written which entitles the buyer to an additional rebate or discount based on the sales price or loan amount for the new home. The additional rebate or discount is possible because the RECAP agent is qualified and skilled in every aspect of the real estate transaction, with complete control and oversight of every vital piece of the transaction. The complete control and oversight ensured that the transaction is stable with few or no deal-breaking surprises.

Assuming that each transaction closed, the following is a summary of the contrast between a traditional real estate transaction and the RECAP transaction. First and most noticeable is the absence of three different agents and their brokerages, all receiving commissions and two separate mortgage originators and their companies, again all receiving commission income. This alone reduces the costs associated with buying, selling, and financing a home, not to mention the original homeowner is only dealing with one person or one team at one company for all of their transactions. The original homeowner can communicate with the same person or team concerning any aspect or piece of each transaction, therefore creating transaction stability and eliminating confusion, frustration, uncertainty and costs. The original home owner would have received a discount or rebate on the home they sold of 2% or $4,000 plus a discount or rebate of 1% or $2,000 from the commission on the purchase of the new home which equals $6,000 in total savings. The savings can be in the form of discounts, rebates or any combination of the two and can be cash, closing cost credit, price reduction on the house, etc. The RECAP agent, unlike the agents in the traditional scenario, would receive 100% commission or $2,000 on the sale of the client's home as well as 100% commission or $7,500 on the purchase of the new home equaling $9,500. The RECAP Company or brokerage would be left with 1% of the loan amount (origination fee) or $2,000. Everyone wins and this synergy is only feasible through use of the RECAP computer system and method.

Control over every aspect by the RECAP method by the agent is what creates the efficiencies, synergies, and savings for each customer. As the examples clearly illustrate with merely one possible RECAP scenario, the entire process is more efficient, easier on clients and transparent to clients, less costly, and safer for all parties involved. Also, in the case of ethical or legal violations, the RECAP computer system and method allows for accountability to be narrowed down specifically to one person or team without the typical excuse-making and finger-pointing prevalent in a traditional real estate transaction.

Typically, the customer feels he or she is pulled in different directions by different people, given conflicting and unreliable information from one or all of the salespeople involved, over charged and double charged for services they do not understand. Unfortunately, due to the unnecessary complexity of a single home purchase and/or sale most consumers are ignorant of what is happening, financially and procedurally when they buy, sell, or finance real estate. The old cliché "ignorance is bliss" could not be further from the truth when it involves buying, selling, or financing real estate. Ignorance is what allows the consumer to be taken advantage of as made obvious in the current mortgage and real estate meltdown. Also, ignorance is what allows the salesmen involved in the transaction to be so uninformed that they are not even able to recoup their own commissions. The RECAP computer system and method does not eliminate financial discrepancies or protect consumers from every scenario, but it greatly reduces the likelihood of a consumer being defrauded, misled, overcharged, under or misrepresented, underserved, and taken advantage of.

Control over every aspect by the RECAP agent is what creates the efficiencies, synergies, and savings for each customer. As the examples clearly illustrate with merely one possible RECAP scenario, the entire transaction is more stable, more efficient, easier on the clients, less costly, and safer for all parties involved. Also, in the case of ethical or legal violations, the RECAP computer system and method allows for accountability to be narrowed down specifically to one person or team without the typical excuse-making and finger-pointing prevalent in a traditional real estate transaction.

The functions performed in unison in the computer system and method of the present invention during the sale, purchase or financing of real estate are listed below.

Identify the client's wants and needs. Determine why the client is selling, buying, or in need of financing.

Evaluate the client's credit. Order credit report and review credit scores, payment history, collection status, and account balances.

Complete loan application. Help client complete the loan application. Applications can be completed online, over the phone, through the mail, or in person.

Obtain documents needed to verify client's income and assets. These include items such as: w-2s, tax returns, bank and investment account statements and other assets.

Determine the type of loan client needs. Establish the down payment (loan-to-value), type (conventional, FHA, VA, subprime), term, and approximate interest rate.

Establish if the client's desired loan conforms to the guidelines. Determine if the client will qualify for the type of loan wanted or needed.

Present alternative loan programs. Allow the client to compare different loan options that offer different down payments, terms, and rates.

Submit completed loan application to processing. Loan file is giving to the processing department for review and submission to underwriting.

Analyze underwriting conditions. Review conditions that will need to be met prior to final loan approval.

Discuss underwriting conditions with client. Present the underwriters findings to the client and prepare responses and solutions to satisfy the conditions.

Coordinate satisfying underwriting conditions with the processing department. Implement a course of action with the processor that satisfies the loan conditions.

Obtain documents needed to satisfy underwriting conditions. Gather items such as verification of employment and verification of rent.

Resolve inaccurate information on client's credit report. Work with the client to help get incorrect or wrong information removed from the credit report.

Review pre-approval with client. Go over the underwriting findings and limitations of the loan with the client.

Review pre-approval with client's agent. Discuss the limitations of the loan with the client's realtor.

Figure 5:
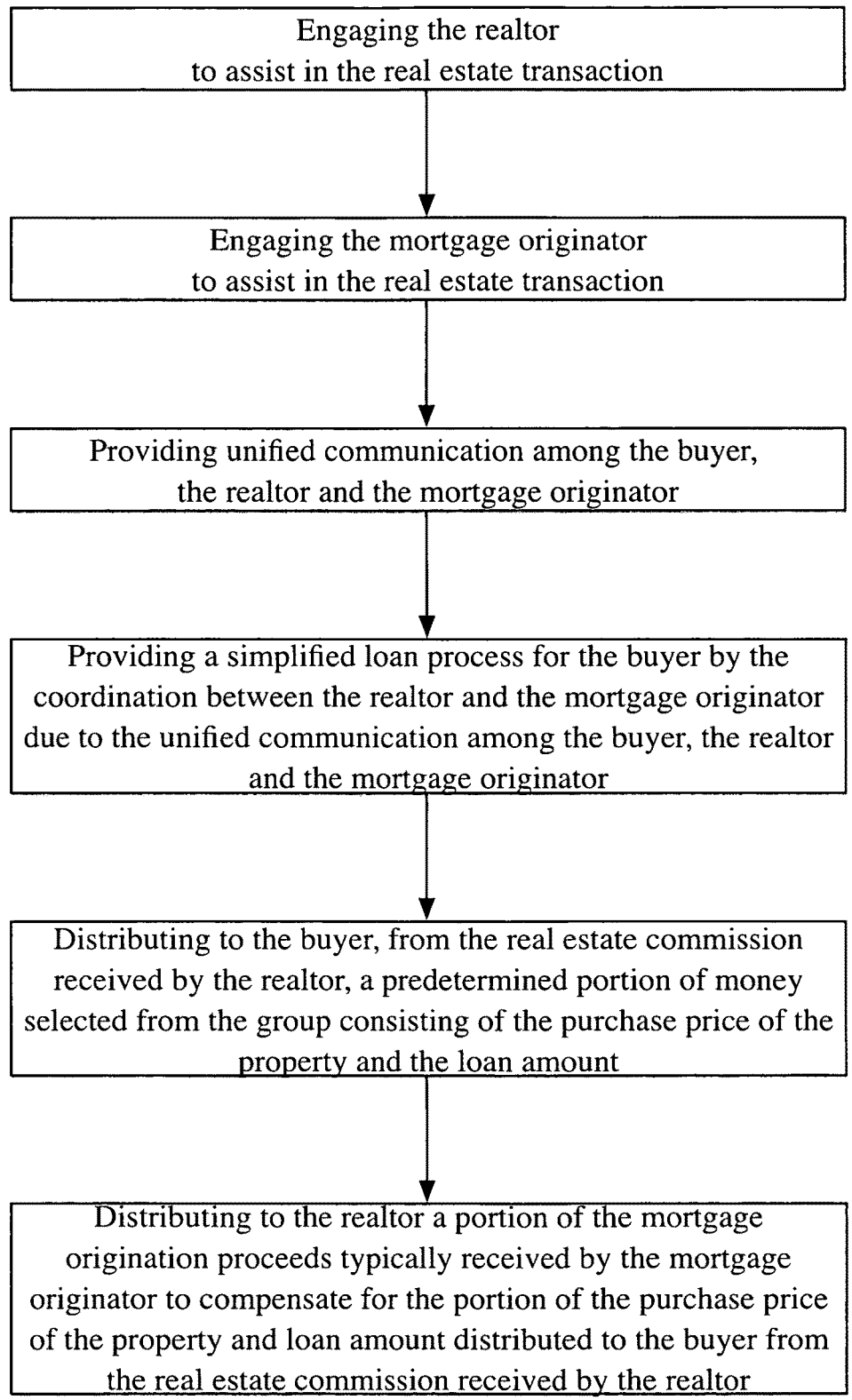
FIG. 5 is a flow chart of a preferred embodiment of a method for real estate transactions concerning the purchase or sale of real property encompassed by the present invention.

FIG. 5 is a flow chart of a preferred embodiment of a method for real estate transactions concerning the purchase or sale of real property encompassed by the present invention.

The computer system and method for real estate transactions in FIG. 5 concerns the purchase or sale of real property in association with a buyer, a realtor that receives a predetermined real estate commission for any sale consummated and a mortgage originator that receives a portion of the mortgage origination proceeds. The method comprises the steps of engaging the realtor to assist in the real estate transaction, engaging the mortgage originator to assist in the real estate transaction, and providing unified communication among the buyer, the realtor and the mortgage originator. Thus, a simplified loan process is provided for the buyer by the coordination between the realtor and the mortgage originator due to the unified communication among the buyer, the realtor and the mortgage originator. The buyer receives, from the real estate commission received by the realtor, a predetermined portion of money from the purchase price of the property and the loan amount. The realtor receives a portion of the mortgage origination proceeds typically received by the mortgage originator to compensate for the portion of the purchase price of the property and loan amount distributed to the buyer from the real estate commission received by the realtor. Therefore, in using the method of the present invention, the buyer receives a predetermined portion of money from the purchase price of the property and/or the loan amount, the realtor receives the full amount of the predetermined real estate commission for the sale he or she made and the mortgage originator receives a proportionately smaller portion of the mortgage origination proceeds.

Figure 6:
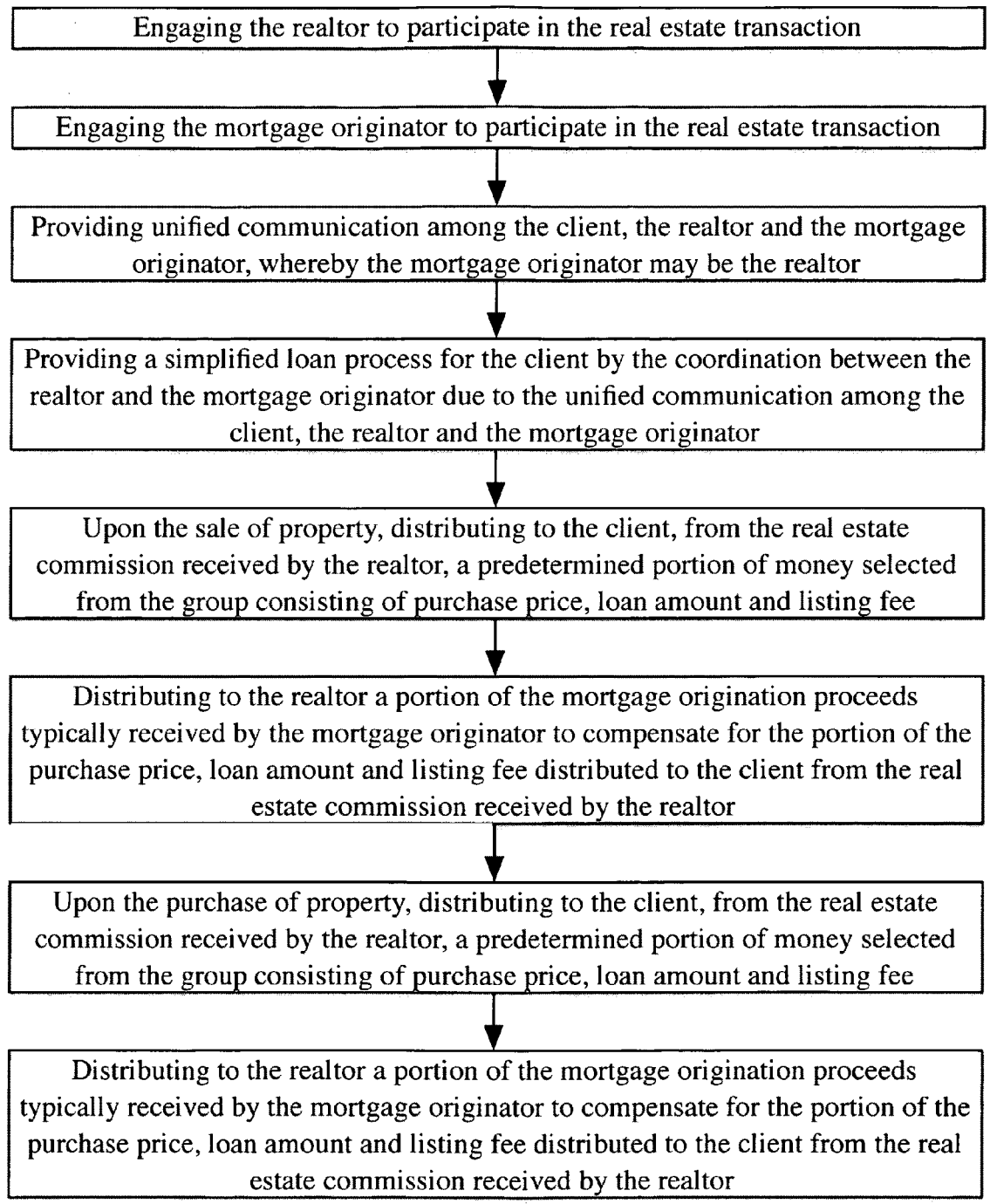
FIG. 6 is a flow chart of another preferred embodiment of a method for real estate transactions concerning the purchase or sale of real property encompassed by the present invention.

FIG. 6 is a flow chart of another preferred embodiment of a method for real estate transactions concerning the purchase or sale of real property encompassed by the present invention. The method for real estate transactions in FIG. 6 concerns the purchase or sale of real property in association with a client that can be a seller and/or a buyer, a realtor that receives a predetermined real estate commission for any sale made and a mortgage originator that receives a portion of the mortgage origination proceeds. The method comprises the steps of engaging the realtor to participate in the real estate transaction, engaging the mortgage originator to participate in the real estate transaction, providing unified communication among the client, the realtor and the mortgage originator, whereby the mortgage originator may be the realtor. Thus, a simplified loan process is created for the client by the coordination between the realtor and the mortgage originator due to the unified communication among the client, the realtor and the mortgage originator.

Upon the sale of property, the client receives, from the real estate commission received by the realtor, a predetermined portion of money from the purchase price, the loan amount and the listing fee. Then, the realtor receives a portion of the mortgage origination proceeds typically received by the mortgage originator to compensate for the portion of the purchase price, loan amount and/or listing fee distributed to the client from the real estate commission received by the realtor. Similarly, upon the purchase of property, the client receives, from the real estate commission received by the realtor, a predetermined portion of money from the purchase price, the loan amount and/or the listing fee. Then, the realtor receives a portion of the mortgage origination proceeds typically received by the mortgage originator to compensate for the portion of the purchase price, loan amount and listing fee distributed to the client from the real estate commission received by the realtor. Therefore, upon a sale, a purchase, and any combination of sales and purchases, the client receives a predetermined portion of money from the purchase price of the property, the loan amount and/or the listing fee, the realtor receives the full amount of the predetermined real estate commission for the sale consummated and the mortgage originator receives a proportionately smaller portion of the mortgage origination proceeds.

Figure 7:
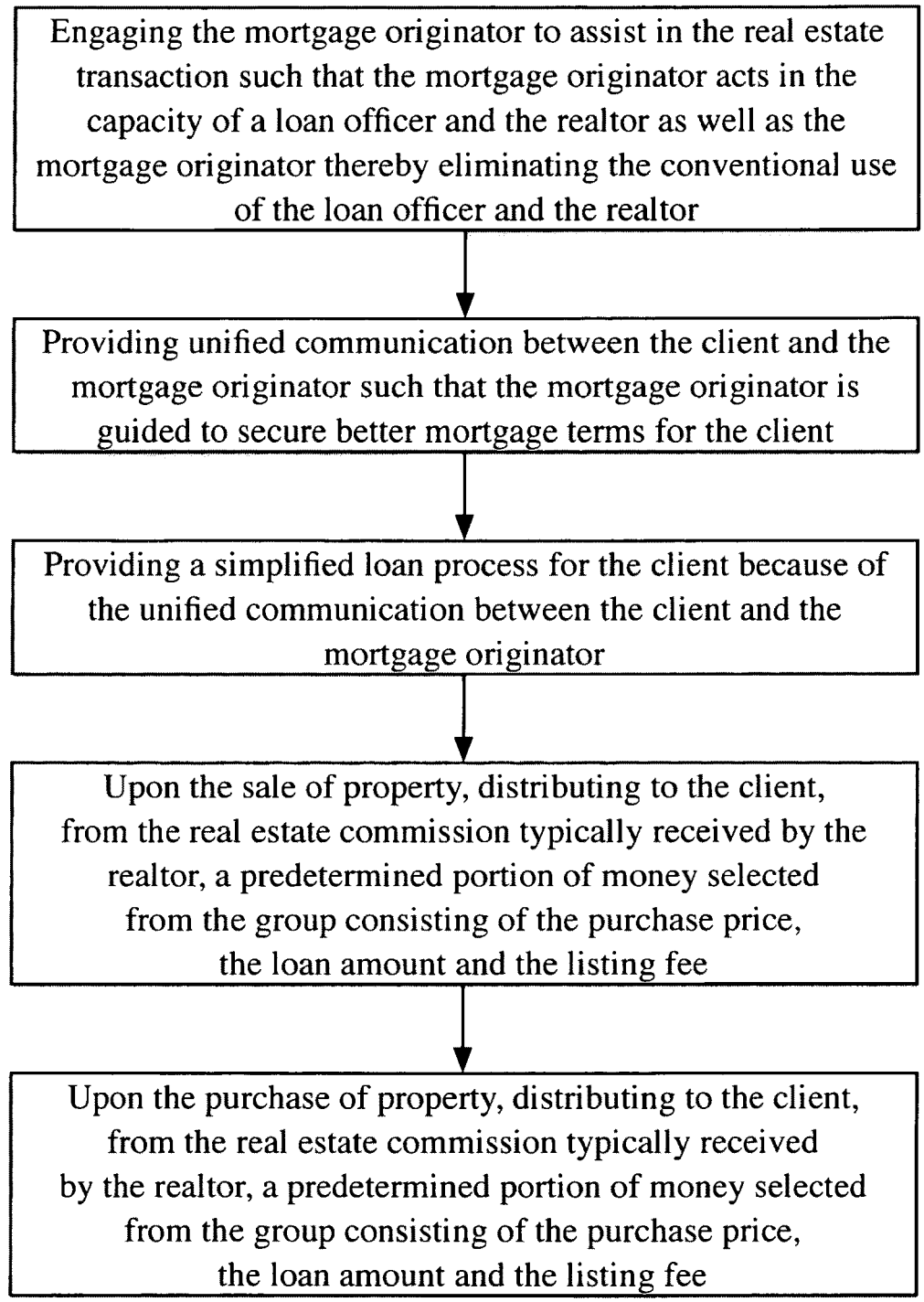
FIG. 7 is a flow chart of yet another preferred embodiment of a method for real estate transactions concerning the purchase or sale of real property encompassed by the present invention.

FIG. 7 is a flow chart of yet another preferred embodiment of a method for real estate transactions concerning the purchase or sale of real property encompassed by the present invention.

The method for real estate transactions illustrated in FIG. 7 concerns the purchase or sale of real property in association with a client that can be a seller and/or a buyer, a realtor that receives a predetermined real estate commission for any sale consummated and a mortgage originator that receives a portion of the mortgage origination proceeds. The method comprises engaging the mortgage originator to assist in the real estate transaction such that the mortgage originator acts in the capacity of a loan officer and the realtor as well as the mortgage originator thereby eliminating the conventional use of the loan officer and the realtor. Providing unified communication between the client and the mortgage originator such that the mortgage originator is guided to secure better mortgage terms for the client. Further, providing a simplified loan process for the client because of the unified communication between the client and the mortgage originator. Upon the sale of property, the client receives, from the real estate commission typically received by the realtor, a predetermined portion of money selected from the group consisting of the purchase price, the loan amount and the listing fee. And, upon the purchase of property, the client receives, from the real estate commission typically received by the realtor, a predetermined portion of money from the purchase price, the loan amount and/or the listing fee. Therefore, upon the sale of property, the purchase of property, and any combination of sales and purchases, the client receives a predetermined portion of money from the purchase price of the property, the loan amount and the listing fee and the mortgage originator receives a proportionately smaller portion of the mortgage origination proceeds.

Figure 8:
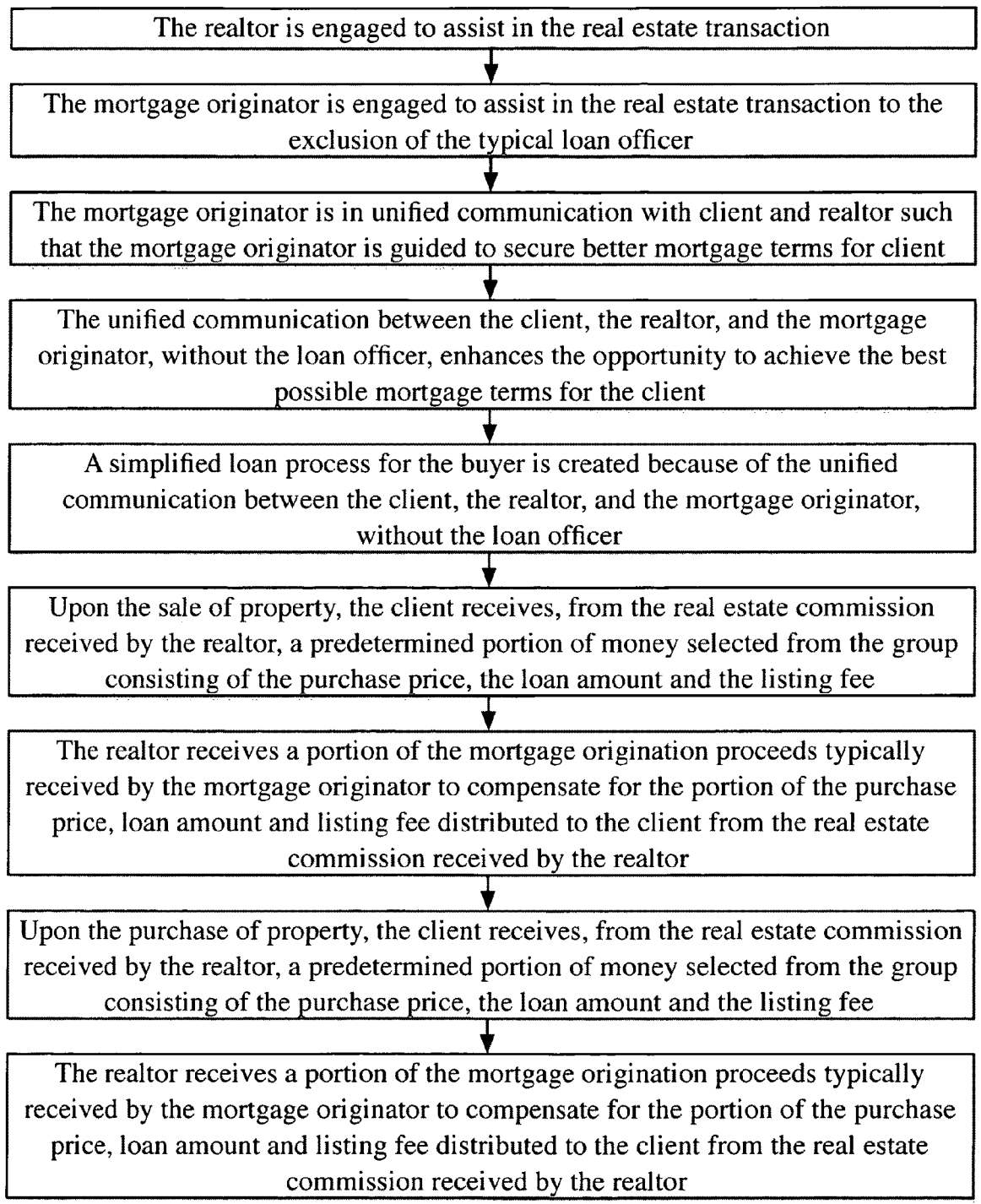
FIG. 8 is a flow chart of a preferred embodiment of a system for real estate transactions concerning the purchase or sale of real property encompassed by the present invention.

FIG. 8 is a flow chart of a preferred embodiment of a system for real estate transactions concerning the purchase or sale of real property encompassed by the present invention. The system for conducting real estate transactions illustrated in FIG. 8 addresses the purchase or sale of real property in association with a client that can be a seller and/or a buyer, a realtor that receives a predetermined real estate commission for any sale consummated and a mortgage originator that receives a portion of the mortgage origination proceeds. The system comprises the realtor being engaged to assist in the real estate transaction and the mortgage originator being engaged to assist in the real estate transaction to the exclusion of the typical loan officer. The mortgage originator is in unified communication with the client and the realtor such that the mortgage originator is guided to secure better mortgage terms for the client. The unified communication between the client, the realtor, and the mortgage originator, without the loan officer, enhances the opportunity to achieve the best possible mortgage terms for the client. A simplified loan process for the buyer is created because of the unified communication between the client, the realtor, and the mortgage originator, without the loan officer. Such that, upon the sale of property, the client receives, from the real estate commission received by the realtor, a predetermined portion of money from the purchase price, the loan amount and/or the listing fee; then, the realtor receives a portion of the mortgage origination proceeds typically received by the mortgage originator to compensate for the portion of the purchase price, loan amount and/or listing fee distributed to the client from the real estate commission received by the realtor. And, upon the purchase of property, the client receives, from the real estate commission received by the realtor, a predetermined portion of money from the purchase price, the loan amount and/or the listing fee; then, the realtor receives a portion of the mortgage origination proceeds typically received by the mortgage originator to compensate for the portion of the purchase price, loan amount and/or listing fee distributed to the client from the real estate commission received by the realtor. Therefore, upon a sale, a purchase, and any combination of sales and purchases, the client receives a predetermined portion of money from the purchase price of the property, the loan amount and/or the listing fee, the realtor receives the full amount of the predetermined real estate commission for the sale consummated and the mortgage originator receives a proportionately smaller portion of the mortgage origination proceeds.

Figure 9:
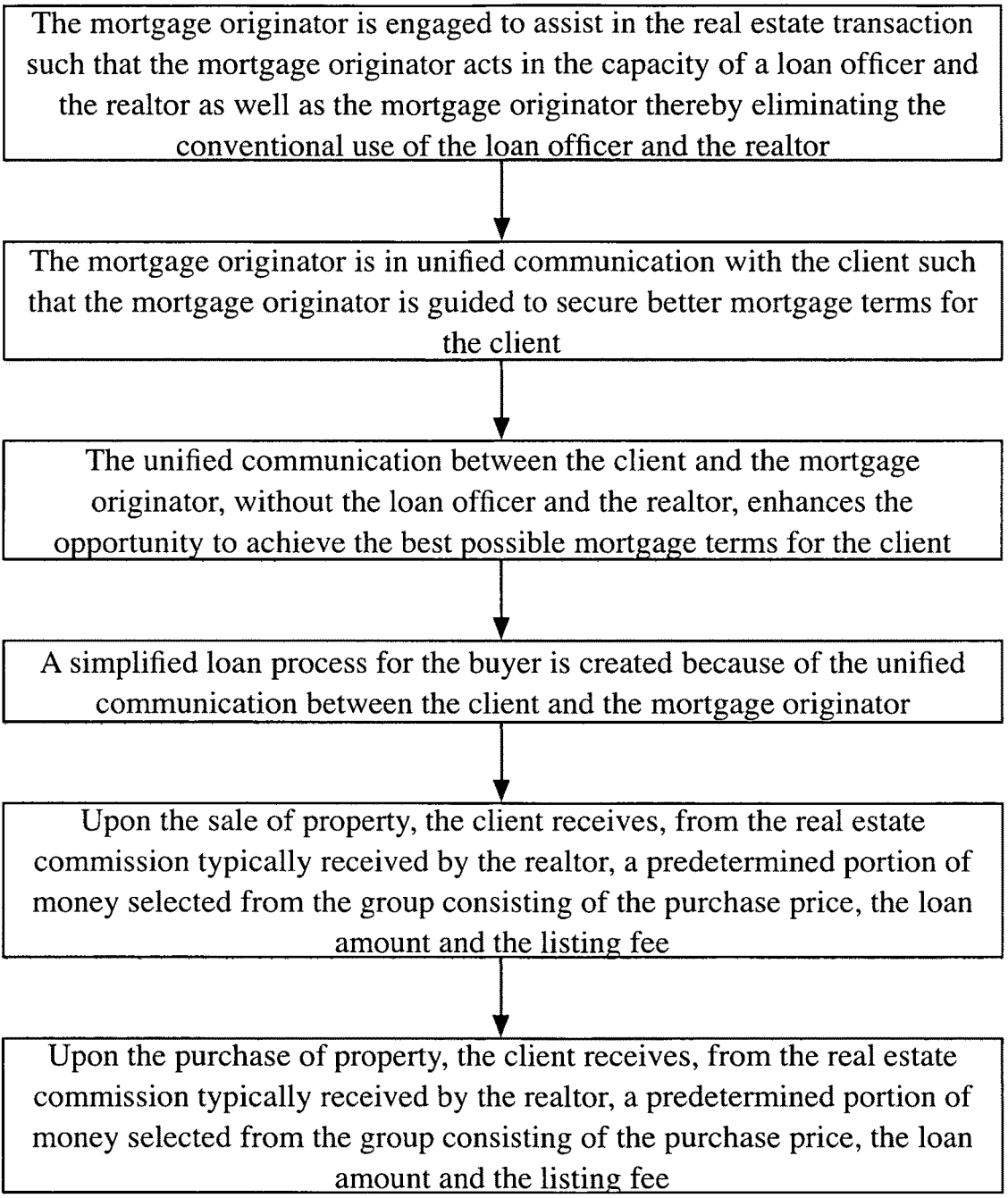
FIG. 9 is a flow chart of another preferred embodiment of a system for real estate transactions concerning the purchase or sale of real property encompassed by the present invention.

FIG. 9 is a flow chart of a preferred embodiment of a system for real estate transactions concerning the purchase or sale of real property encompassed by the present invention. The system for conducting real estate transactions illustrated in FIG. 9 concerns the purchase or sale of real property in association with a client that can be a seller and a buyer, a realtor that receives a predetermined real estate commission for any sale consummated and a mortgage originator that receives a portion of the mortgage origination proceeds. The system comprises the mortgage originator being engaged to assist in the real estate transaction such that the mortgage originator acts in the capacity of a loan officer and the realtor as well as the mortgage originator thereby eliminating the conventional use of the loan officer and the realtor. The mortgage originator is in unified communication with the client such that the mortgage originator is guided to secure better mortgage terms for the client. The unified communication between the client and the mortgage originator, without the loan officer and the realtor, enhances the opportunity to achieve the best possible mortgage terms for the client. Thus, a simplified loan process is created for the buyer because of the unified communication between the client and the mortgage originator. Upon the sale of property, the client receives, from the real estate commission typically received by the realtor, a predetermined portion of money from the purchase price, the loan amount and/or the listing fee. And, upon the purchase of property, the client receives, from the real estate commission typically received by the realtor, a predetermined portion of money from the purchase price, the loan amount and/or the listing fee. Therefore, upon the sale of property, the purchase of property, and/or any combination of sales and purchases, the client receives a predetermined portion of money from the purchase price of the property, the loan amount and the listing fee and the mortgage originator receives a proportionately smaller portion of the mortgage origination proceeds.

EXAMPLES

Example 1

An agent has found her client a $150,000 home and the client originates the mortgage with the originator.

$150,000×3%=$4,500.

The agent receives $3,000 from the real estate commission.
Licensed agents also receive $1,500 of the mortgage origination proceeds.
The client receives a $1,500.00 refund from the real estate commission portion of the transaction within 3-5 business days of funding.

Example 2

An agent's client allows her to sell their house, represent them on purchase of their next home, and originates their mortgage.
The client sells a $100,000 house in which the commission is 6% and another company represents the buyer. You would receive $3,000. Of which, you would offer your client a $1,000 refund within 3-5 business days of funding on their next home.
The client then buys a $150,000 house and lets the originator originate their loan. Licensed agents would receive $3,000 from the real estate commission and $1,500 from the mortgage origination proceeds. Your client would receive another $1,500 refund within 3-5 business days of funding.
The agent would make $6,500 in this transaction.
The client would receive $2,500 in refunds.
Note: If the agent does not split the 6% commission in the original listing she would receive $9,500 in this transaction and her client would still receive $2,500 in refunds.

Example 3

A client buys a $50,000 house that pays a 3% commission. Originator does not originate a mortgage for the client.
Licensed agents would receive $750.00 ($50,000×3%=$1,500×50%).
The client buys a $100,000 home that pays a 3% commission.
Originator does not originate a mortgage for the client.
Licensed agent would receive $2,000 ($100,000×3%=$3,000−$1,000).
The client sells their $100,000 house and does not buy another home or originate a loan with Originator.
Licensed agent would receive $2,000 ($100,000×3%=$3,0000−$1,000).

Example 4

A non-licensed agent has found his client a $150,000 home and they originate their mortgage with Originator.

$150,000×3%=$4,500.

The non-licensed agent receives $3,000 from the real estate commission.
The client will receive $1,500 from the real estate commission within 3-5 business days of funding.

Example 5

A client allows a non-licensed agent to sell their house, represent them on the purchase of their next home, and originates their mortgage with Originator.
The client sells a $100,000 house in which the commission is 6% and another company or another agent represents the buyer. The agent would receive $3,000. Of which the agent would offer his client a $1,000 refund.
The client then buys a $150,000 house and lets Originator originate their loan. The agent would receive $3,000 from the real estate commission. The client would receive another $1,500 refund within 3-5 business days of funding.
The non-licensed agent would make $5,000 in this transaction.
The client would receive $2,500 in refunds.
Note: if the non-licensed agent does not split the commission in the original listing, he would receive $8,000 in this transaction and his client would still receive $2,500 in refunds.

Example 6

A client buys or sells a $150,000 house in which there is a 3% commission. The client does not originate a mortgage with Originator.
For a non-licensed agent, the total real estate commission would be $4,500 ($150,000×3%). The non-licensed agent would receive $3,000 from the proceeds of the real estate commission. Originator would receive $1,500 from the proceeds of the real estate commission.
The client would not receive any money back after closing from Originator.

FIG. 10 is a chart of an example of a used home purchase in the form of a double combination using the system and method of the present invention.

FIG. 11A/B is a chart of an example of a new home purchase in the form of a triple combination using the system and method of the present invention.

The Real Estate Competitive Advantage Program (RECAP) computer system and method achieves greater commissions and profits by bundling the purchase, sale and financial services. The RECAP methodology is an analytical model based on user defined criteria (inputs), which allow a licensee the ability to create and control the commission income and company profits (output). The RECAP computer program provides an advantage not realized by today's standards. Typically, there are multiple parties to a transaction for facilitating the buying, selling and financial services where each receives a percentage of the transaction. The RECAP system and method capitalizes on that inefficiency by bundling services provided by a single source which reduce the requirement to pay every party for their specific service and streamlines the overall process by reducing the time to conduct a transaction. In conclusion, the RECAP software program results in a lower cost per transaction while increasing the average gross income per transaction to the software licensee and customer. The components are as follows:

Modules:

1. Administrator—Creates account profiles for the following:
User
   User Type: administrator or user
   User Information: Name, Address, Phone, Software license number & Expiration
   Commission: Percentage of Sale Price depending on Buyer Rep/Seller Rep/Mortgage Rep
Company
   Company Contact Information
   Define Set Fees for Calculation Module (Processing, Courier, Application)
Competitor 2. RECAP Calculation Software—Calculates commission income and company profits.

Figure 12:
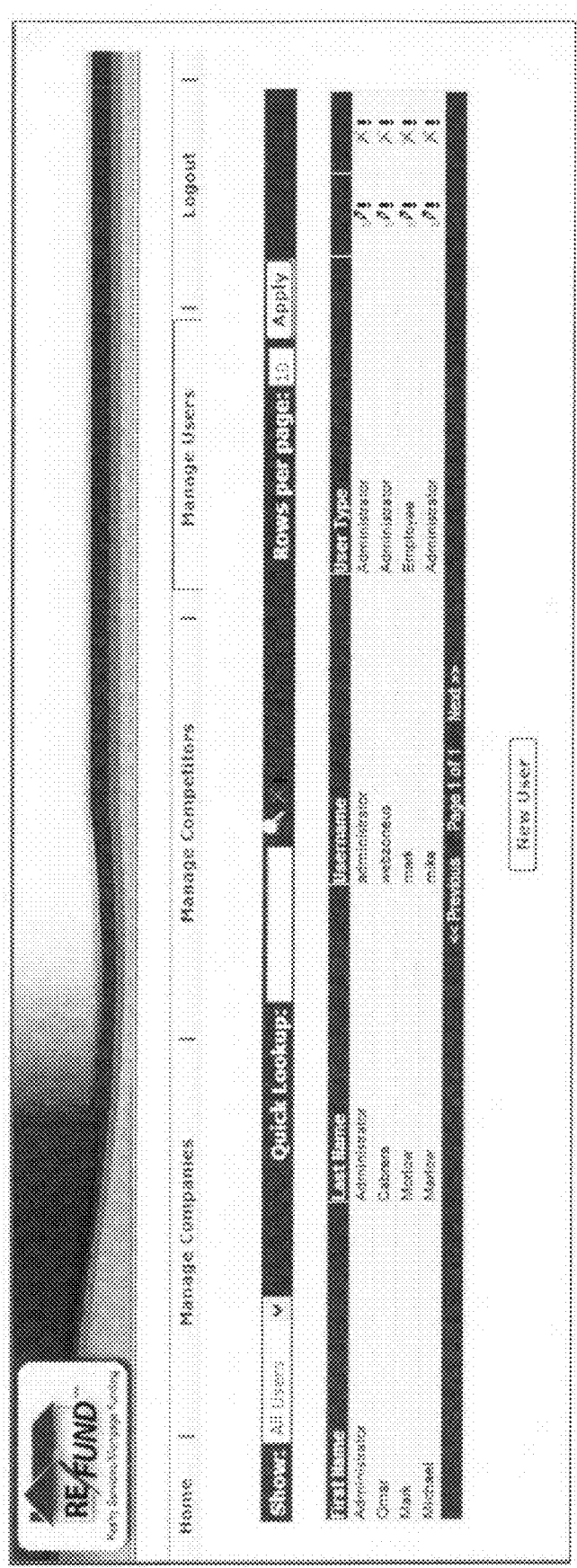
FIG. 12 is a screen capture of the administrator screen for managing the user.

FIG. 12 is a screen capture of the administrator screen for managing the user.

The administrator module creates the user account profile by defining:
   User Type: administrator or user
   User Information: Name, Address, Phone, Software license number & Expiration
   Commission: Percentage of Sale Price depending on Buyer Rep/Seller Rep/Mortgage Rep.

Figure 13:
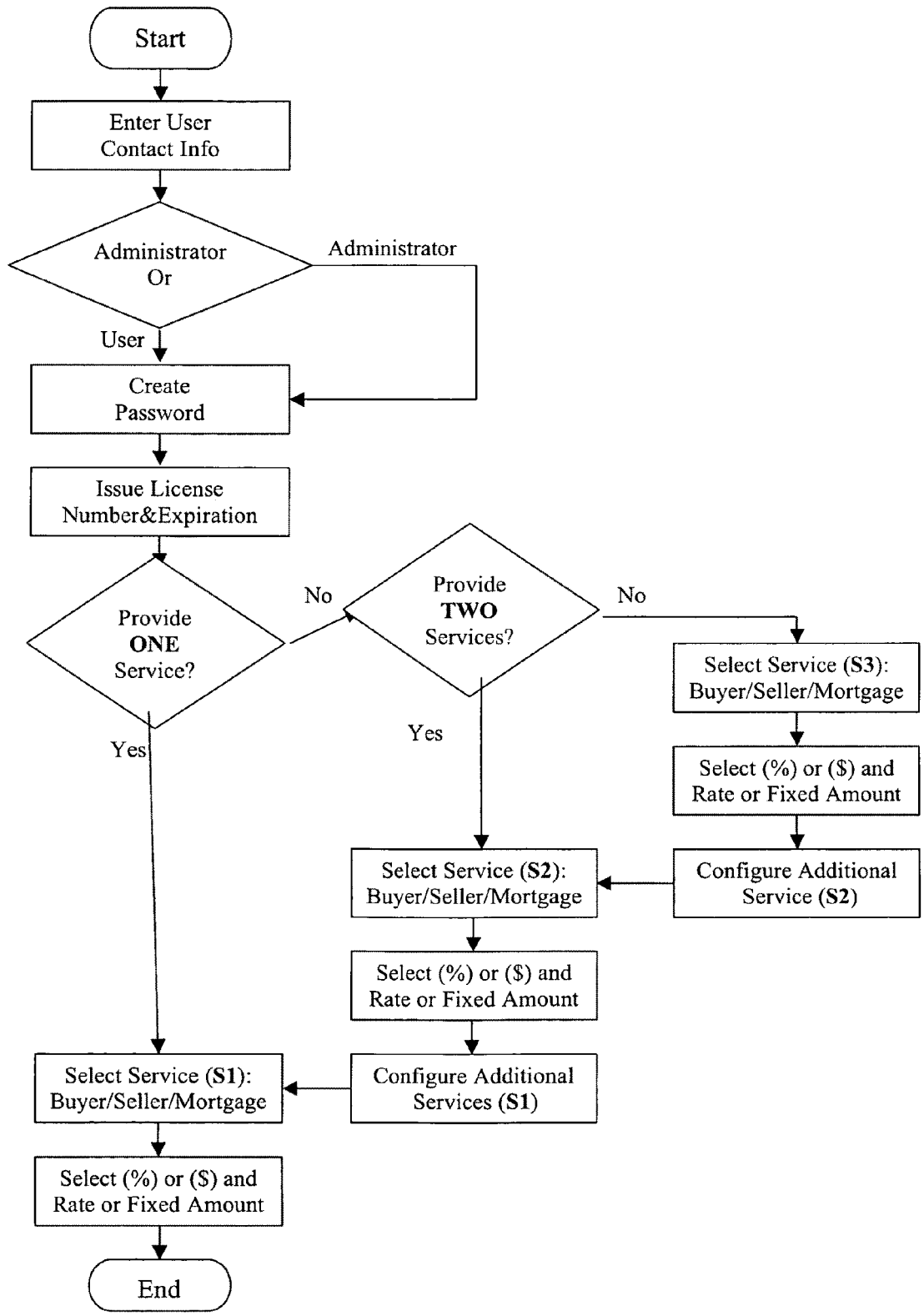
FIG. 13 a flow chart of the administrator module for managing users in a preferred embodiment of the computer system for real estate transactions concerning the purchase or sale of real property encompassed by the present invention.

FIG. 13 a flow chart of the administrator module for managing users in a preferred embodiment of the computer system for real estate transactions concerning the purchase or sale of real property encompassed by the present invention.

Figure 14:
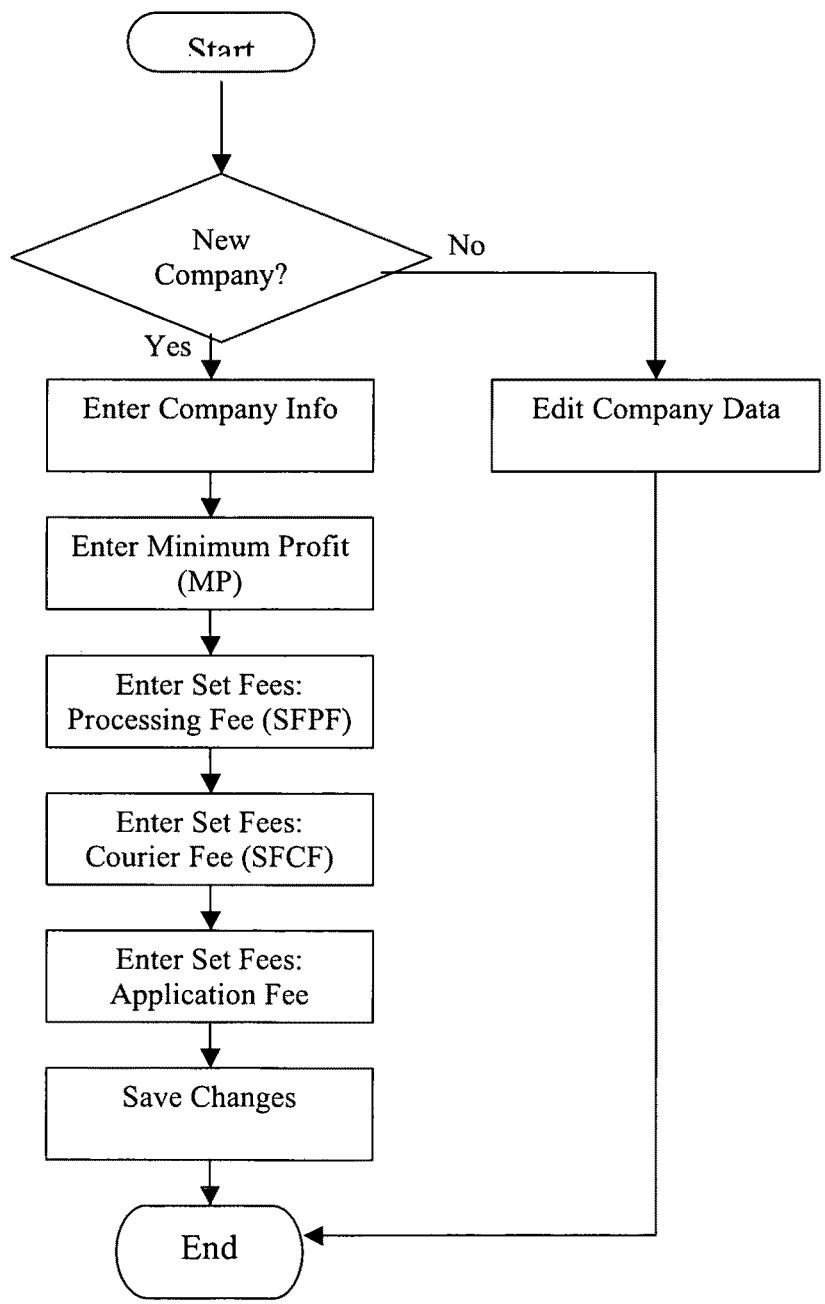
FIG. 14 is flow chart of the administrator module for managing the company in a preferred embodiment of the computer system for real estate transactions concerning the purchase or sale of real property encompassed by the present invention.

FIG. 14 is flow chart of the administrator module for managing the company in a preferred embodiment of the computer system for real estate transactions concerning the purchase or sale of real property encompassed by the present invention.

Figure 15:
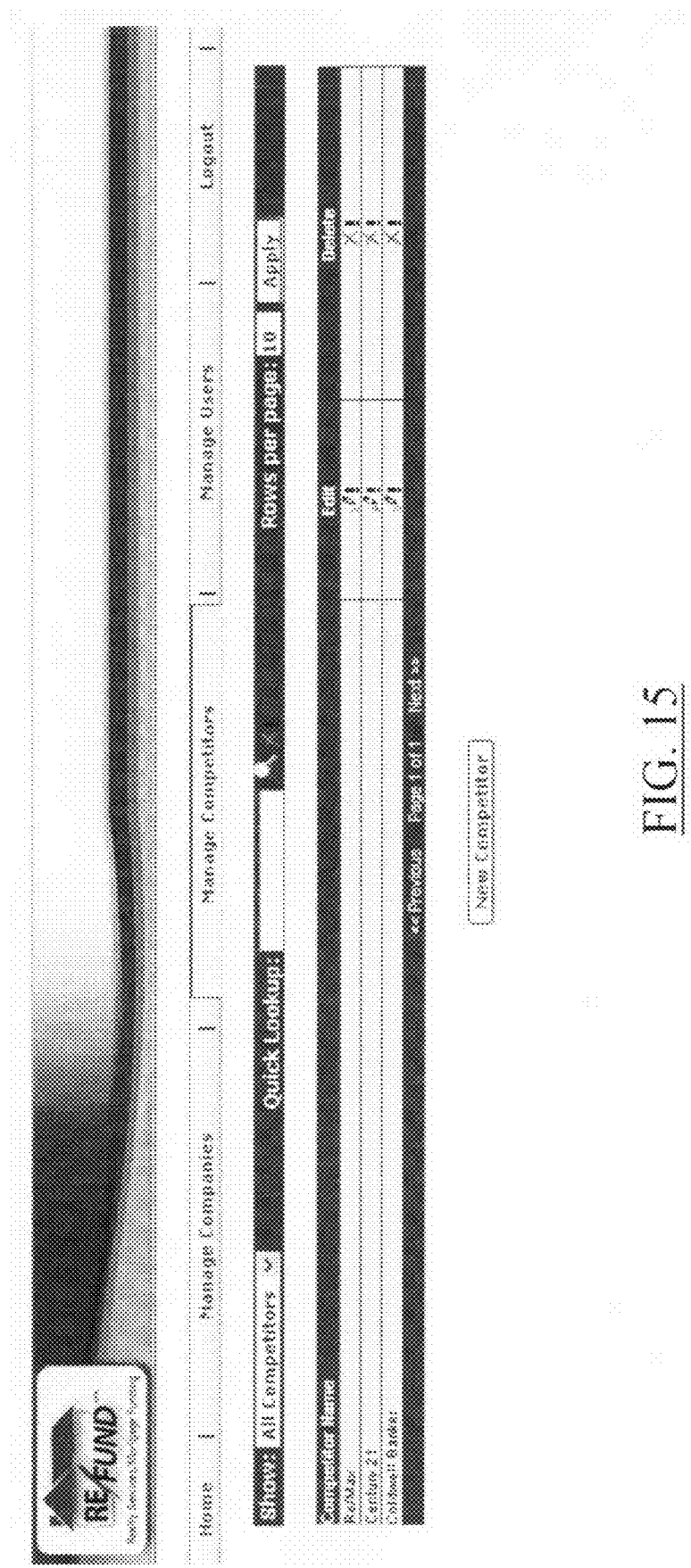
FIG. 15 is a screen capture of the administrator screen for managing competitors.

FIG. 15 is a screen capture of the administrator screen for managing competitors. This screen creates a competitor profile and is used by the Calculation Module in the Comparison tab that provides a drop-down button to access this competitor data.

Figure 16:
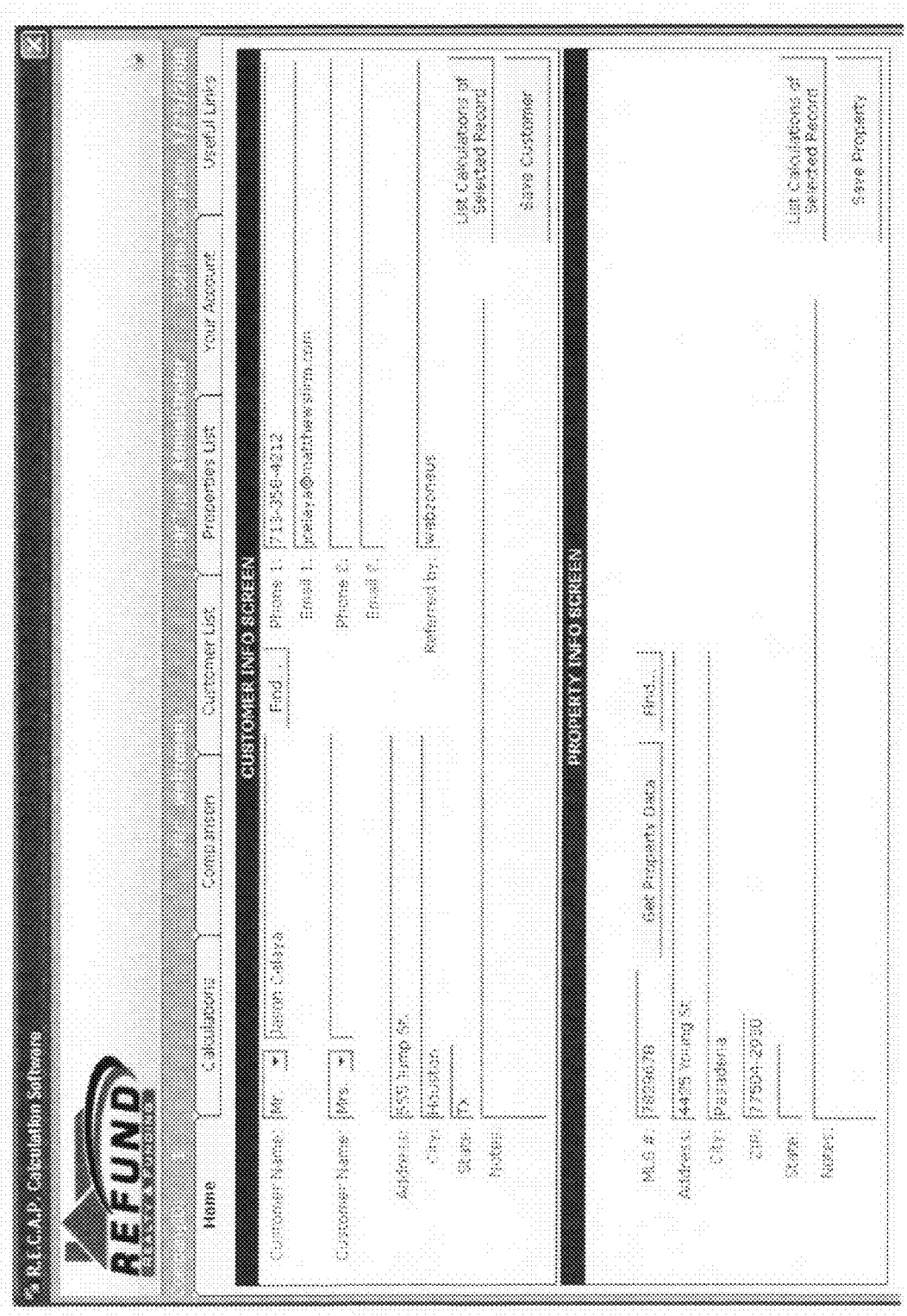
FIG. 16 is a screen capture of the user screen for managing customer information and property information.

FIG. 16 is a screen capture of the user screen for managing customer information and property information. This screen provides two sections:

CUSTOMER INFO SCREEN: Enter the new customer data or lookup an existing customer which has already been entered. Type the name and hitting "FIND" button. The data fields will populate with the saved information for that specified customer. For a new customer, hit the "SAVE CUS- TOMER" button and the data will be saved under the agents account for later retrieval or statistical purposes for the company.

PROPERTY INFO SCREEN: You can lookup a property that has already been analyzed for a specified customer by hitting the "GET PROPERTY DATA" and another screen will pop-up that contains the other interested properties previously analyzed and saved. Simply double click a property in the pop-up listing and it will automatically populate the data fields for the property info. If it is a new property, not previously analyzed, then enter the MLS# or physical address which will run a check through HAR.COM to determine the existence of that specified property and populate the data fields accordingly.

Figure 17:
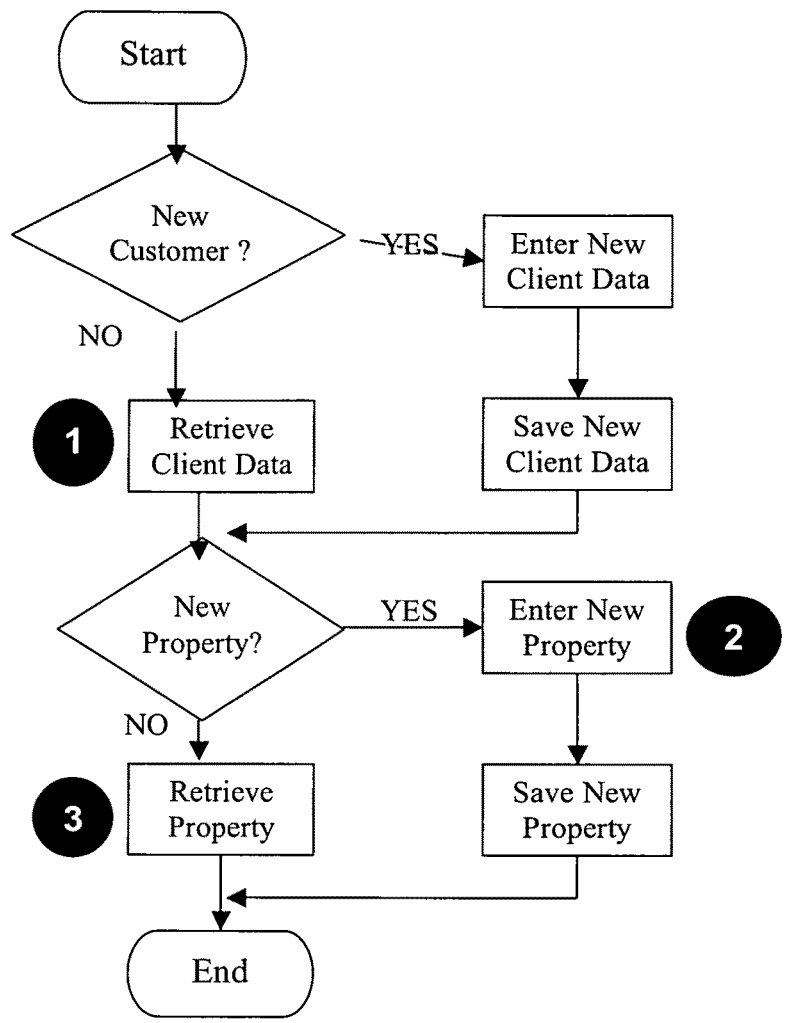
FIG. 17 is flow chart of the user module for managing the customer information and property information in a preferred embodiment of the computer system for real estate transactions concerning the purchase or sale of real property encompassed by the present invention.

FIG. 17 is flow chart of the user module for managing the customer information and property information in a preferred embodiment of the computer system for real estate transactions concerning the purchase or sale of real property encompassed by the present invention. The flow chart provides for:
1. Retrieve by entering name of customer and hit the "FIND" button which will import matching data from the Customer List.
2. Type MLS# or Physical address and hit the "GET PROPERTY DATA" button which is linked to HAR.COM and will import property info.
3. Type MLS# or Physical address and hit the "FIND" button which is will open a new window listing the properties saved in the Properties List tab that match the request. Additionally, there is a button labeled "LIST CALCULATIONS OF SELECTED RECORD" that will open a window illustrating saved calculations already performed on that specific property.

Figure 18:
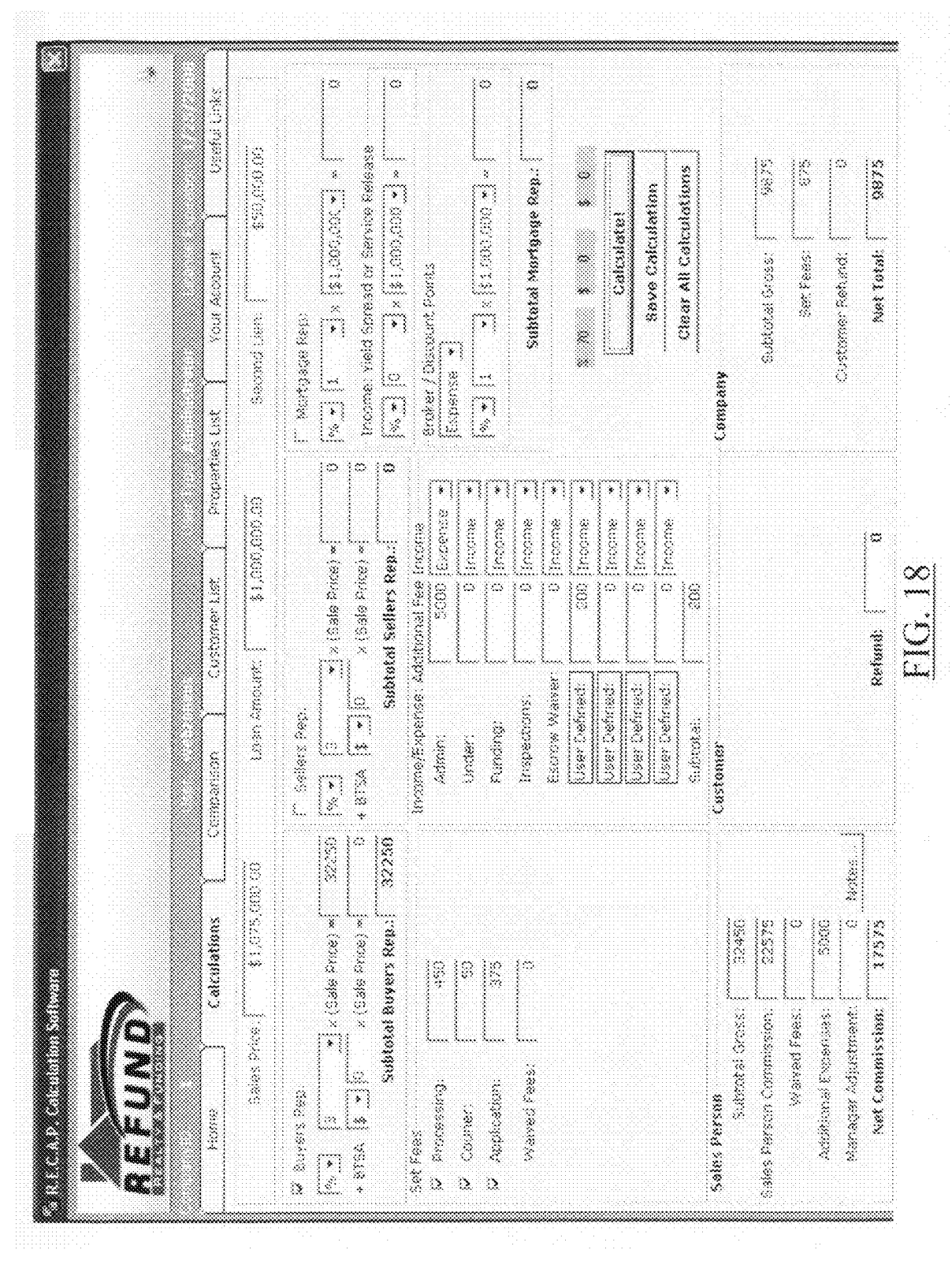

FIG. 18 is a screen capture of the user screen for managing the input data concerning the buyer's representative and the seller's representative in a preferred embodiment of the computer system for real estate transactions concerning the purchase or sale of real property encompassed by the present invention. This tab is used to enter and toggle the variable rates and fees utilized by the RECAP algorithm to calculate a Sales Person's Net Commission, Company profit. Specifically, the following flowchart illustrates when an agent is the buyer's representative. The user account is created with Set Fees fixed at predetermined value and commission based from a fixed percentage of the property sales price. As illustrated in the screen capture, a 70% multiplier is used when an agent represents a buyer or a seller.

Figure 19:
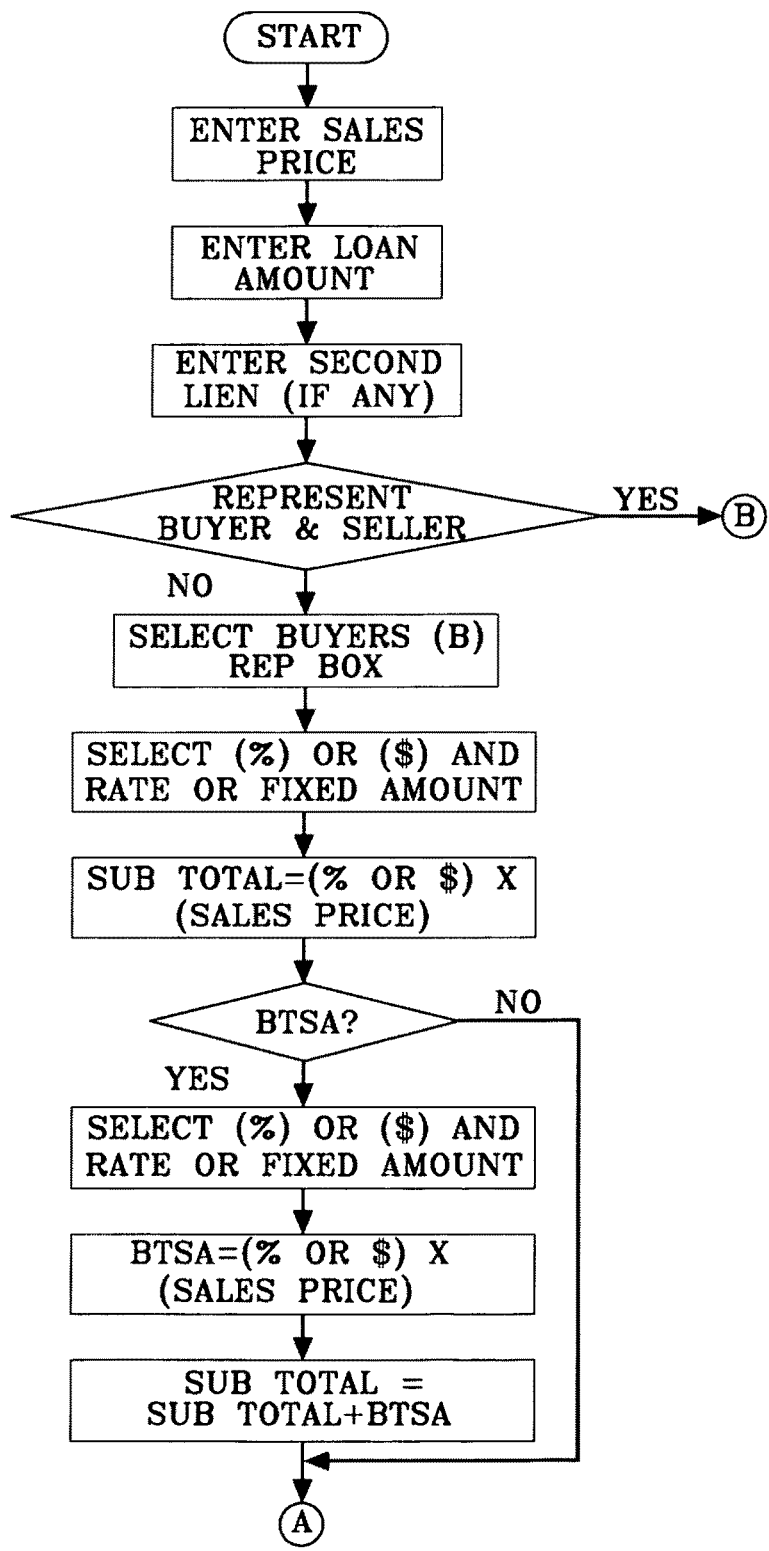
FIG. 19 is flow chart of the front end of the user module for managing the buyer's representative in a preferred embodiment of the computer system for real estate transactions concerning the purchase or sale of real property encompassed by the present invention.

FIG. 19 is flow chart of the front end of the user module for managing the buyer's representative in a preferred embodiment of the computer system for real estate transactions concerning the purchase or sale of real property encompassed by the present invention.

Figure 20:
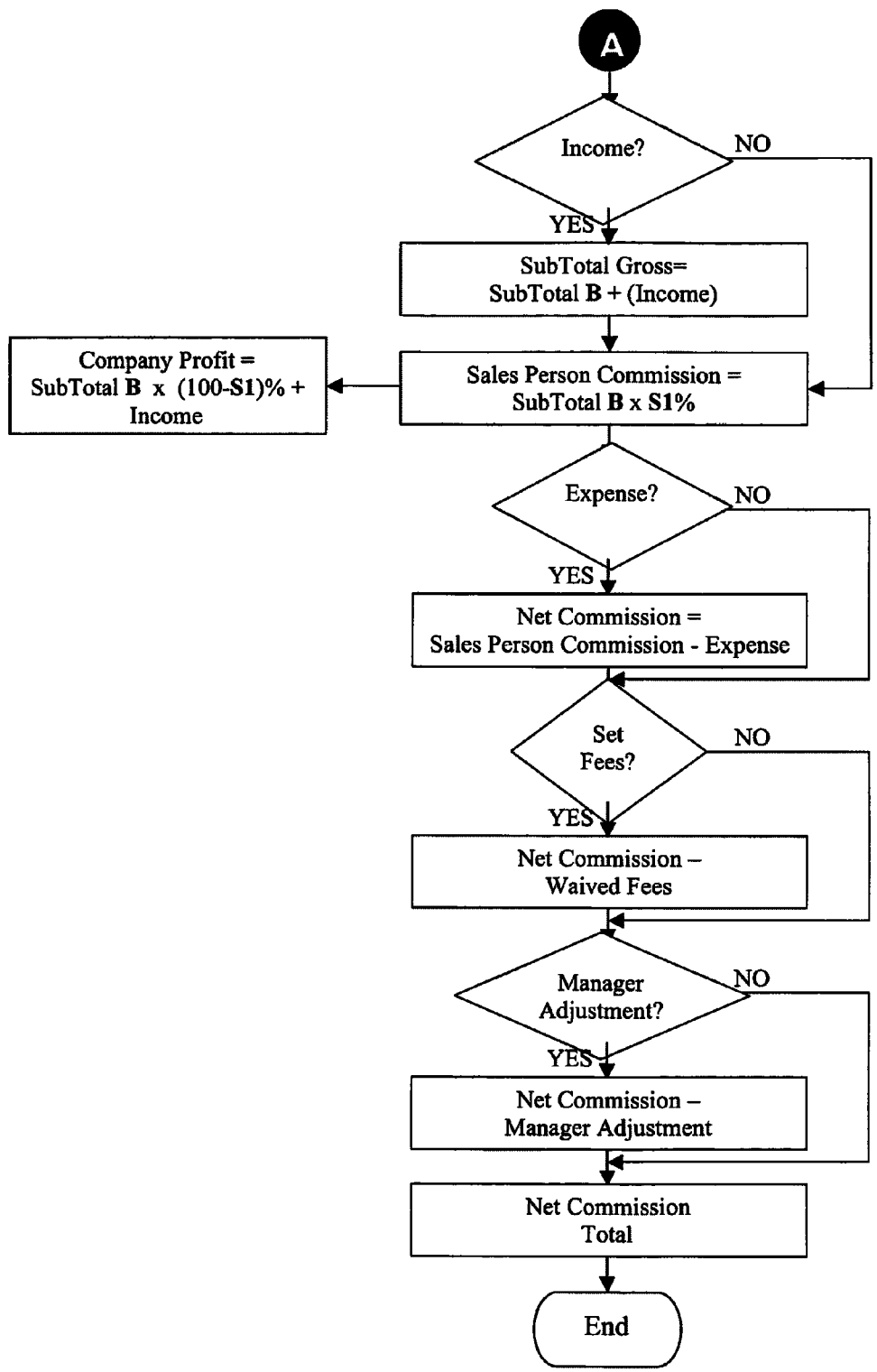
FIG. 20 is flow chart of the back end of the user module for managing the buyer's representative with the front end illustrated in FIG. 19.

FIG. 20 is flow chart of the back end of the user module for managing the buyer's representative with the front end illustrated in FIG. 19.

Figure 21:
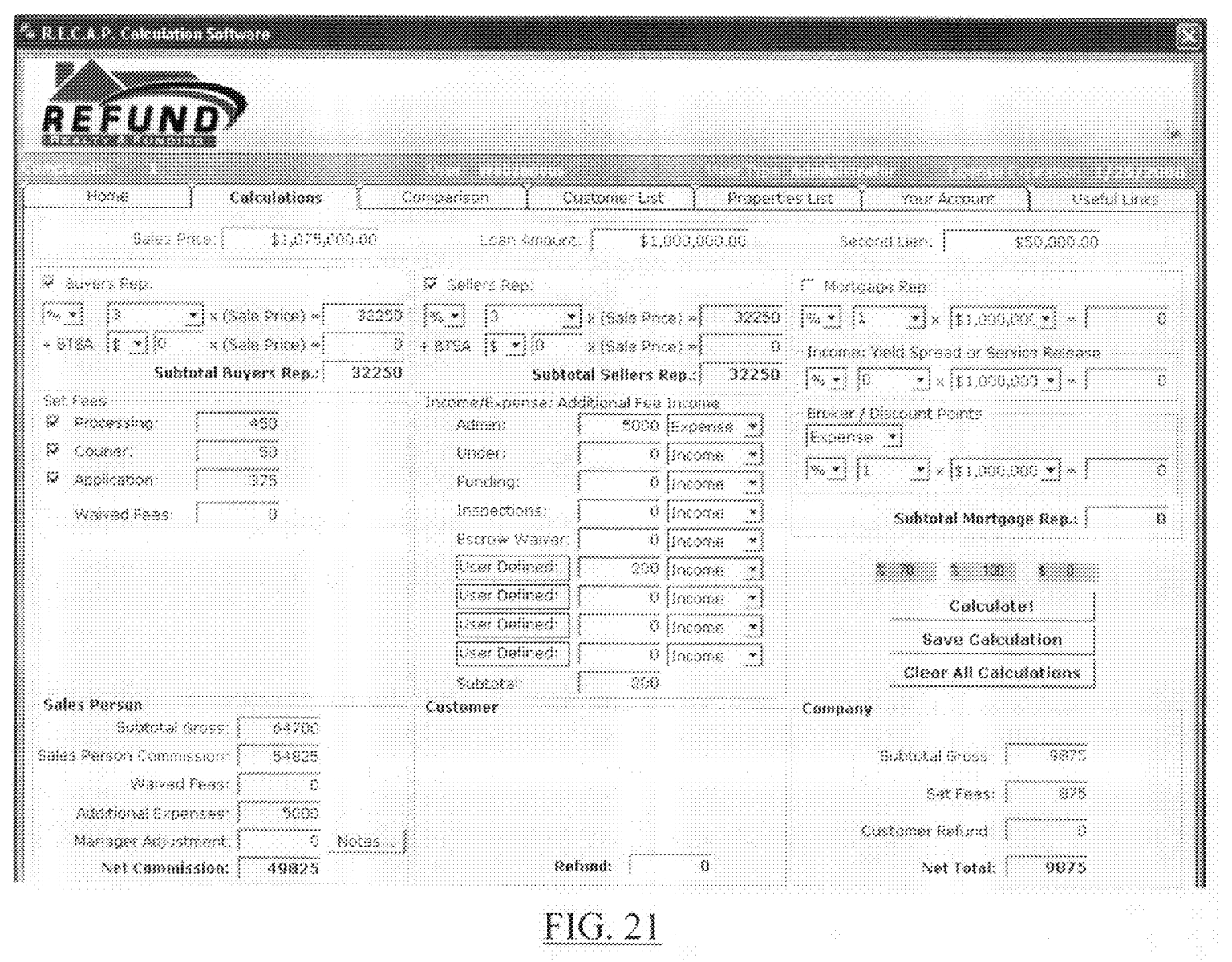

FIG. 21 is a screen capture of the user screen for managing the calculations associated with the buyer's representative and the seller's representative in a preferred embodiment of the computer system for real estate transactions concerning the purchase or sale of real property encompassed by the present invention. This tab is used to enter and toggle the variable rates and fees utilized by the RECAP algorithm to calculate a Sales Person's Net Commission, Company profit. Specifically, the following flowchart illustrates when an agent is the buyer's representative and seller's representative. The user account is created with Set Fees fixed at predetermined value and commission based from a fixed percentage of the property sales price. As illustrated in the screen capture, a 70% multiplier is used when an agent represents a buyer, in addition to 100% when they represent a seller. These percentages are multiplied with the Sales Price to calculate the Sales Person's Commission field.

Figure 22:
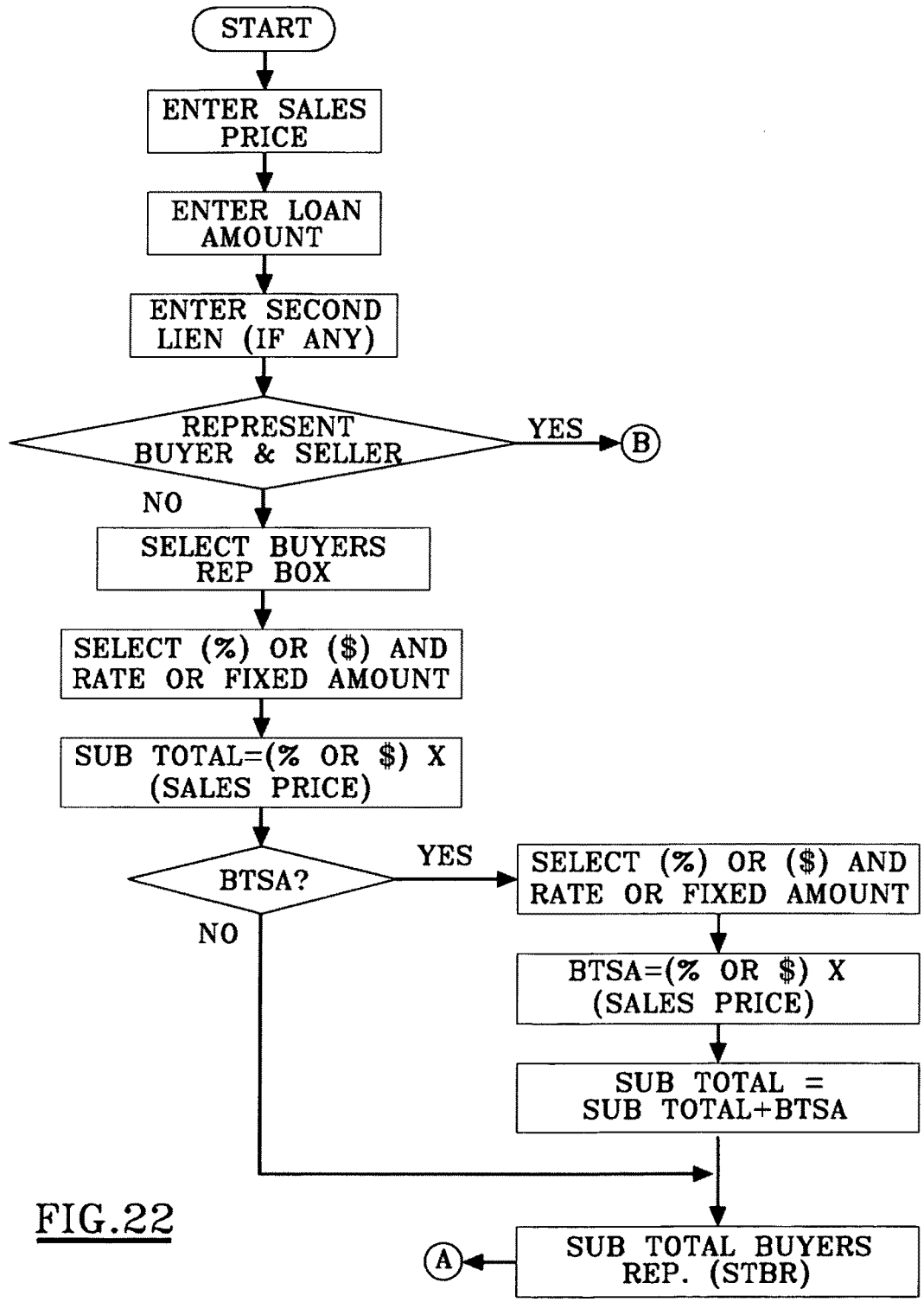
FIG. 22 is flow chart of the front portion of the user module for managing the calculations associated with the buyer's representative and the seller's representative in a preferred embodiment of the computer system for real estate transactions concerning the purchase or sale of real property encompassed by the present invention.

FIG. 22 is flow chart of the front portion of the user module for managing the calculations associated with the buyer's representative and the seller's representative in a preferred embodiment of the computer system for real estate transactions concerning the purchase or sale of real property encompassed by the present invention.

Figure 23:
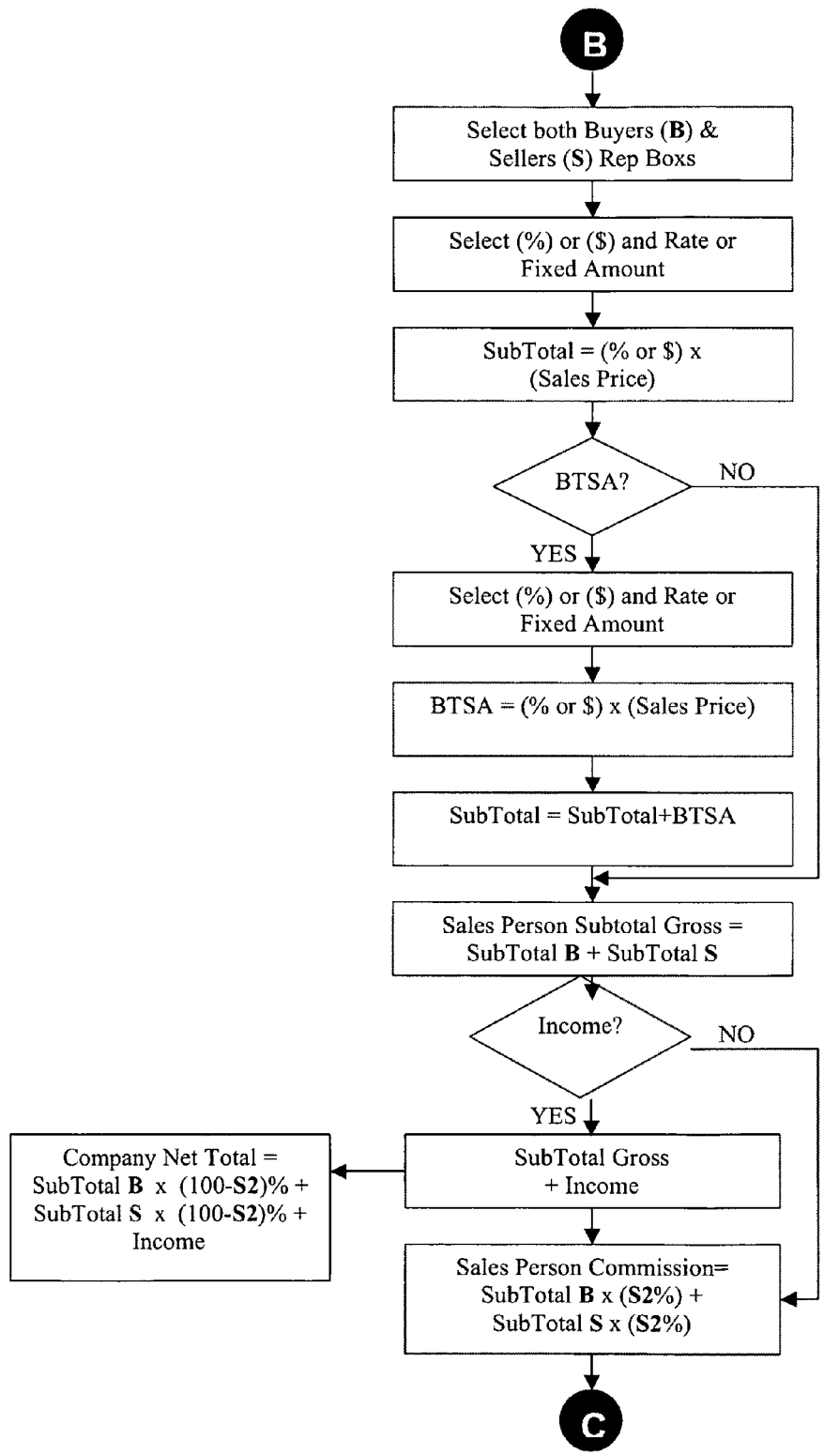
FIG. 23 is flow chart of the middle portion of the user module for managing the calculations associated with the buyer's representative and the seller's representative in a preferred embodiment of the computer system for real estate transactions concerning the purchase or sale of real property encompassed by the present invention.

FIG. 23 is flow chart of the middle portion of the user module for managing the calculations associated with the buyer's representative and the seller's representative in a preferred embodiment of the computer system for real estate transactions concerning the purchase or sale of real property encompassed by the present invention.

Figure 24:
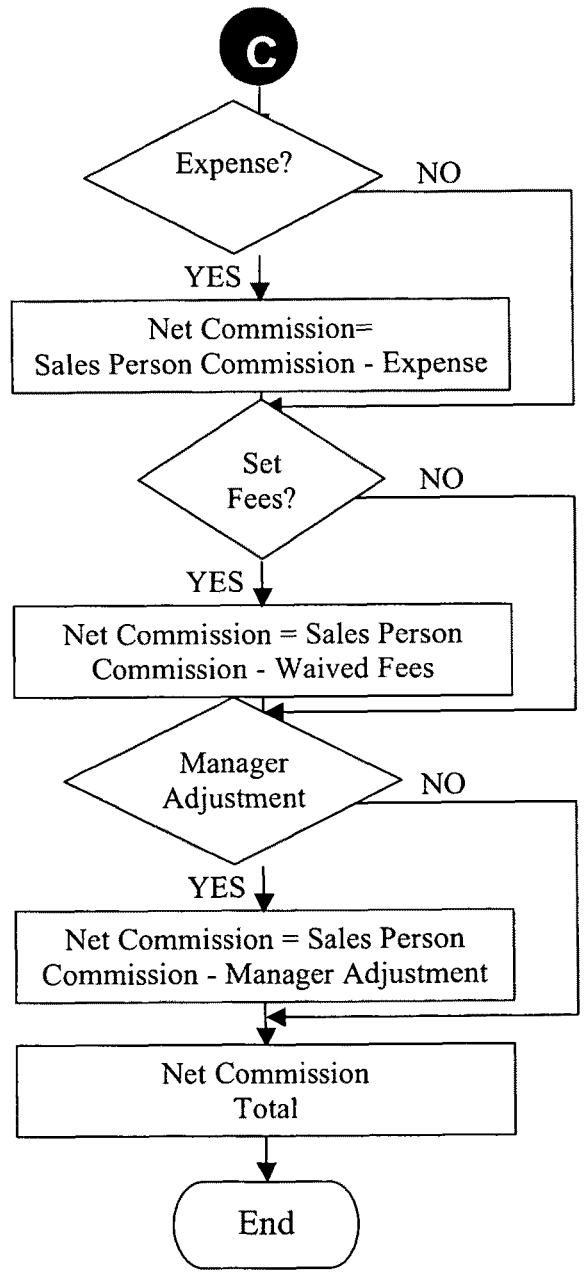
FIG. 24 is flow chart of the end portion of the user module for managing the calculations associated with the buyer's representative and the seller's representative in a preferred embodiment of the computer system for real estate transactions concerning the purchase or sale of real property encompassed by the present invention.

FIG. 24 is flow chart of the end portion of the user module for managing the calculations associated with the buyer's representative and the seller's representative in a preferred embodiment of the computer system for real estate transactions concerning the purchase or sale of real property encompassed by the present invention.

Figure 25:
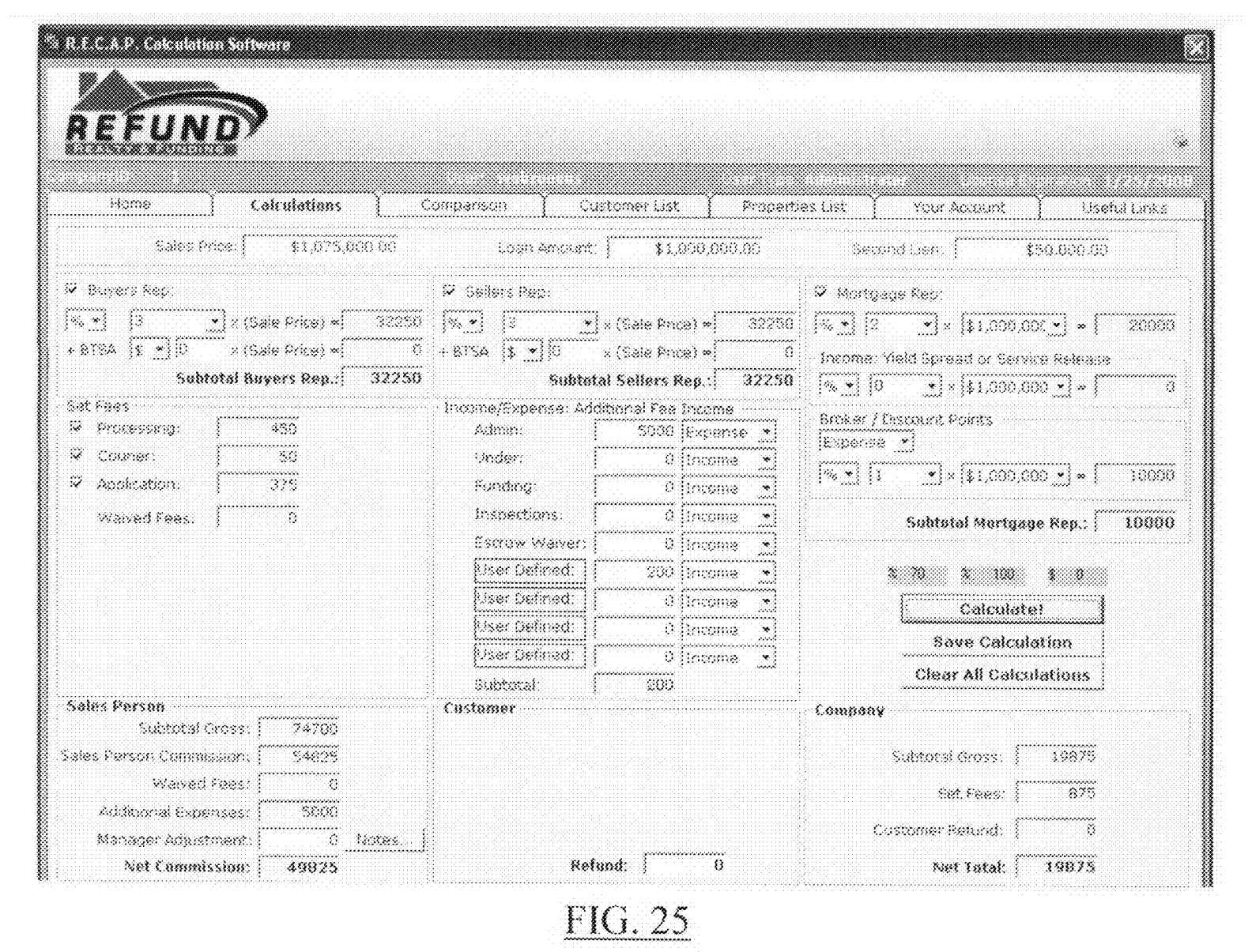

FIG. 25 is a screen capture of the user screen for managing the calculations associated with the buyer's representative, seller's representative, and mortgage representative in a preferred embodiment of the computer system for real estate transactions concerning the purchase or sale of real property encompassed by the present invention. This tab is used to enter and toggle the variable rates and fees utilized by the RECAP algorithm to calculate a Sales Person's Net Commission, Company profit. Specifically, the following flowchart illustrates when an agent is the buyer's representative, seller's representative, and mortgage representative. The user account is created with Set Fees fixed at predetermined value and commission based from a fixed percentage of the property sales price. As illustrated in the screen capture, a 70% multiplier is used when an agent represents a buyer and 100% when they represent a seller. These percentages are multiplied with the Sales Price to calculate the Sales Person's Commission field. In addition to the calculations previously discussed, this process takes into account the mortgages fees, income, and expenses.

Figure 26:
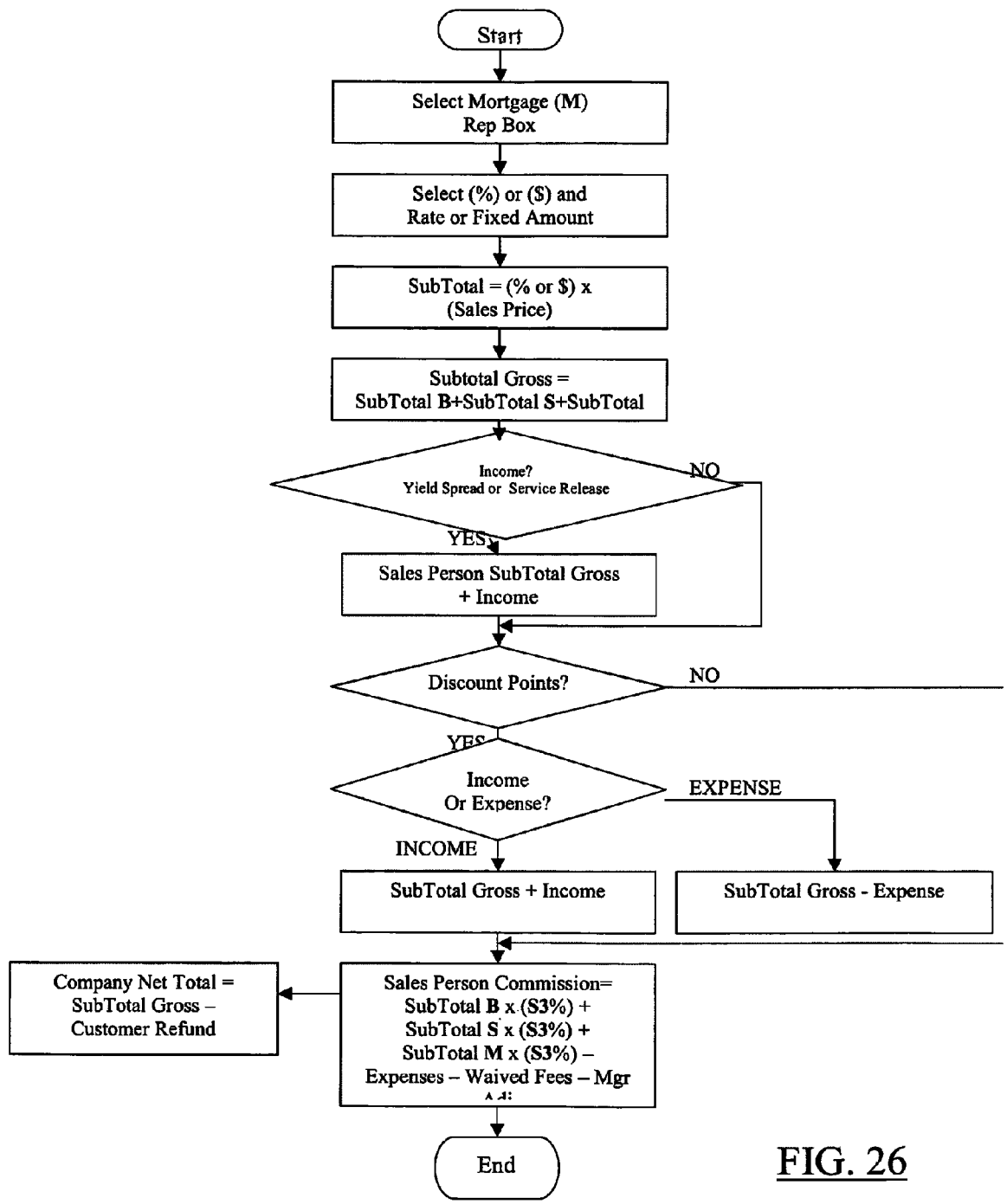
FIG. 26 is flow chart of the user module for managing the calculations associated with the buyer's representative, seller's representative, and mortgage representative as illustrated in the screen capture of FIG. 25 in a preferred embodiment of the computer system for real estate transactions concerning the purchase or sale of real property encompassed by the present invention.

FIG. 26 is flow chart of the user module for managing the calculations associated with the buyer's representative, seller's representative, and mortgage representative as illustrated in the screen capture of FIG. 25 in a preferred embodiment of the computer system for real estate transactions concerning the purchase or sale of real property encompassed by the present invention.

Figure 27:
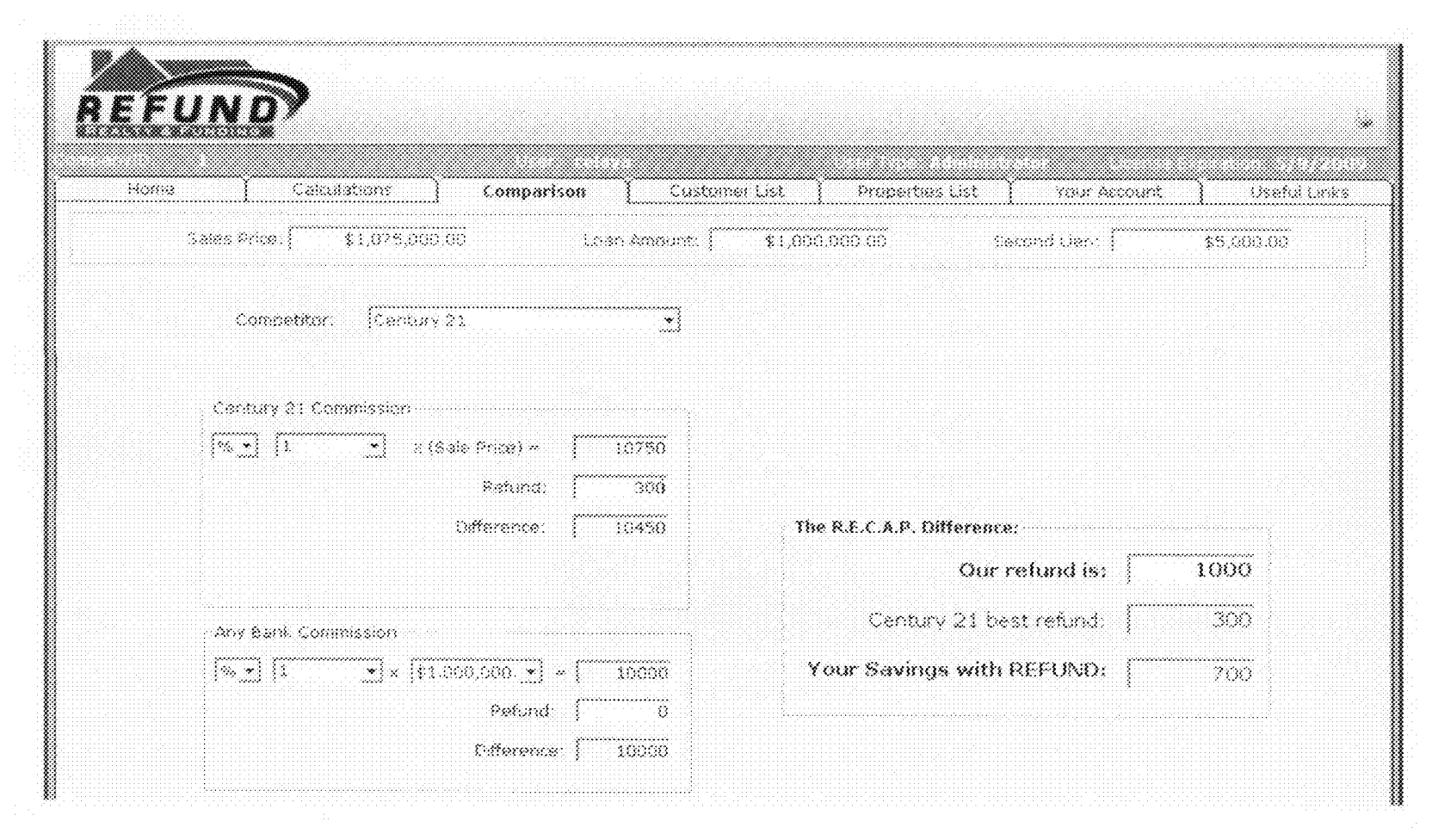

FIG. 27 is a screen capture of the user screen for comparing the calculations associated with a sales person's net commission and the company profit in a preferred embodiment of the computer system for real estate transactions concerning the purchase or sale of real property encompassed by the present invention. This tab is used to enter and toggle the variable rates and fees utilized by the RECAP algorithm to calculate a Sales Person's Net Commission, Company profit. Specifically, the following flowchart illustrates when an agent is the buyer's representative, seller's representative, and mortgage representative. The user account is created with Set Fees fixed at predetermined value and commission based from a fixed percentage of the property sales price. As illustrated in the screen capture, a 70% multiplier is used when an agent represents a buyer and 100% when they represent a seller. These percentages are multiplied with the Sales Price to calculate the Sales Person's Commission field. In addition to the calculations previously discussed, this process takes into account the mortgages fees, income, and expenses.

Figure 28:
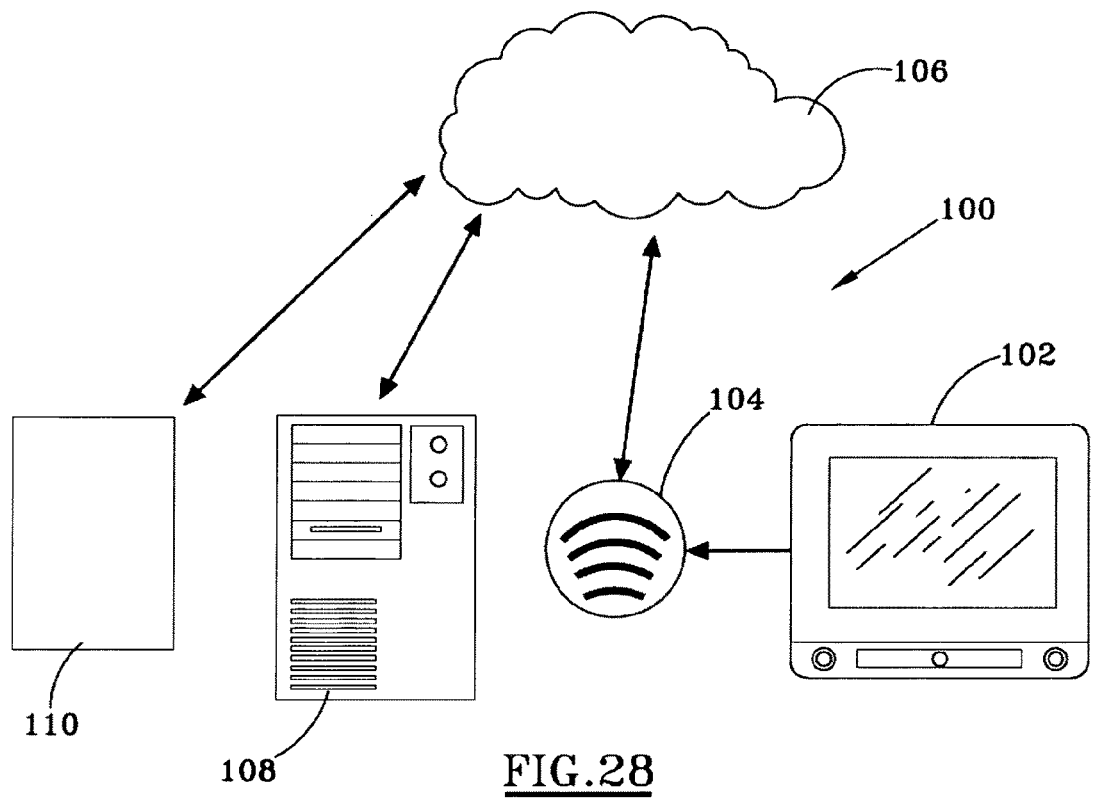
FIG. 28 is a computer system encompassed by the present invention.

FIG. 28 is a computer system 100 encompassed by the present invention. The computer system 100 comprises an input-output device 102, a communications device 104, 106, a processor 108 and a storage device 110.

Figure 29:
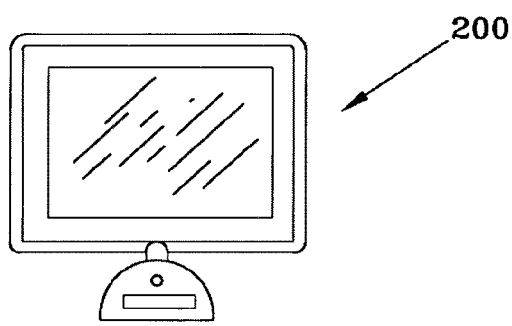
FIG. 29 is another computer system encompassed by the present invention.

FIG. 29 is another computer system 200 encompassed by the present invention. The computer system 200 is an all in one system comprising an input-output device, a communications or bus device, a processor and a storage device.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed:

1. A computer system for dividing and distributing a predetermined real estate commission and a mortgage origination fee associated with the sale of real property from a seller to a buyer in real estate transactions concerning the purchase or sale of real property in association with the buyer, a realtor that receives the predetermined real estate commission for any sale consummated and a mortgage originator that receives the mortgage origination fee as a portion of the mortgage origination proceeds, the computer system comprising:

(a) a processor;
(b) a communications device in association with the processor;
(c) a storage device in association with the processor and the communications device;
(d) an input-output device in association with the processor, the communications device and the storage device such that the processor, the communications device, the storage device and the input-output device are in active engagement one with the other;
(e) the input-output device providing an engagement for the buyer, the realtor and the mortgage originator, wherein the engaged input-output device transmits information to the processor by the communications device for analysis of the information by the processor, and wherein the information is retained in and retrieved from the storage device as needed, for providing a simplified loan process for the buyer by the coordination between the realtor and the mortgage originator due to the communication achieved with the computer system among the buyer, the realtor and the mortgage originator;
(f) the input-output device receiving from the buyer a first amount of money associated with the sale of the real property sufficient to pay for the real property, and to pay the real estate commission, and to pay the mortgage origination fee defined as a first value;
(g) the processor receives the first value from the communications device via the input-output device for apportioning the first value into at least three allotments, the three allotments comprising a first allotment of money for the purchase of the real property, a second allotment of money for the payment of the real estate commission, and a third allotment of money for the payment of the mortgage origination fee;
(h) the processor combining the second allotment of money for the payment of the real estate commission and the third allotment of money for the payment of the mortgage origination fee for creating a total service allotment;
(i) the processor further apportioning the total service allotment into a predetermined amount of money selected from the group consisting of the purchase price of the property and the loan amount, and-a portion of the mortgage origination proceeds, and combinations thereof, such that the predetermined amount of money is stored in the storage device for later access;
(j) the processor further apportioning the portion of the mortgage origination proceeds typically received by the mortgage originator to compensate for the portion of the purchase price of the property and loan amount apportioned to the buyer from the real estate commission received by the realtor such that the portion of the mortgage origination proceeds is stored in the storage device for later access;
(k) the input-output device that is available to the buyer to access the predetermined amount of money, and to accept or reject the predetermined amount of money;
(l) the input-output device that is available to the realtor to access the portion of the mortgage origination proceeds, and to accept or reject the portion of the mortgage origination proceeds; and
(m) wherein the processor receives a rejection from either the buyer or the realtor for the amount or portion, respectively, then the processor recalculates the amount and portion for the buyer and the realtor to access via the input-output device until both the buyer accepts the amount and the realtor accepts the portion, such that pursuant to the transaction the buyer receives a predetermined amount of money from the purchase price of the property and the loan amount, the realtor receives the full amount of the predetermined real estate commission for the sale consummated and the mortgage originator receives a proportionately smaller portion of the mortgage origination proceeds.

2. The computer system defined in claim 1, wherein when the input-output device provides an engagement for the buyer, the realtor and the mortgage originator and transmits information to the processor by the communications device for analysis of the information by the processor, the analysis further comprises using a reason why the buyer is selling, buying or in need of financing.

3. The computer system defined in claim 1, wherein when the input-output device provides an engagement for the buyer, the realtor and the mortgage originator and transmits information to the processor by the communications device for analysis by the processor, the analysis further comprises using the buyer's credit, credit report, credit scores, payment history, collection status and account balances.

4. The computer system defined in claim 1, wherein when the input-output device provides an engagement for the buyer, the realtor and the mortgage originator and transmits information to the processor by the communications device for analysis by the processor, the analysis further comprises using information in a loan application.

5. The computer system defined in claim 1, wherein when the input-output device provides an engagement for the buyer, the realtor and the mortgage originator and transmits information to the processor by the communications device for analysis by the processor, the analysis further comprises using the buyer's income and assets.

6. The computer system defined in claim 1, wherein when the input-output device provides an engagement for the buyer, the realtor and the mortgage originator and transmits information to the processor by the communications device for analysis by the processor, the analysis further comprises determining the type of loan, establishing the down payment, the loan type, the loan term, and the approximate interest rate.

7. The computer system defined in claim 1, wherein when the input-output device provides an engagement for the buyer, the realtor and the mortgage originator and transmits information to the processor by the communications device for analysis by the processor, the analysis further comprises determining if the buyer's desired loan conforms to the guidelines and that the buyer will qualify for the desired loan.

8. The computer system defined in claim 1, wherein when the input-output device provides an engagement for the buyer, the realtor and the mortgage originator device and transmits information to the processor by the communications device for analysis by the processor, the analysis further comprises using alternative loan programs to allow the client to compare different loan options that offer different down payments, terms and rates.

9. The computer system defined in claim 1, wherein when the input-output device provides an engagement for the buyer, the realtor and the mortgage originator and transmits information to the processor by the communications device for analysis by the processor, the analysis further comprises using underwriting conditions for reviewing conditions that will need to be met prior to final loan approval.

10. The computer system defined in claim 1, wherein when the input-output device provides an engagement for the buyer, the realtor and the mortgage originator and transmits information to the processor by the communications device for analysis by the processor, the analysis further comprises using an the underwriter's findings to prepare responses and solutions to satisfy the conditions.

11. The computer system defined in claim 1, wherein when the input-output device provides an engagement for the buyer, the realtor and the mortgage originator and transmits information to the processor by the communications device for analysis by the processor, the analysis further comprises resolving inaccurate information on buyer's credit report.

12. The computer system defined in claim 1, wherein when the input-output device provides an engagement for the buyer, the realtor and the mortgage originator and transmits information to the processor by the communications device for analysis by the processor, the analysis further comprises using a pre-approval of underwriting findings and limitations of the loan.

13. The computer system defined in claim 1, wherein when the input-output device provides an engagement for the buyer, the realtor and the mortgage originator and transmits information to the processor by the communications device for analysis by the processor, the analysis further comprises using a pre-approval of underwriting findings with input from the realtor.

* * * * *